(12) United States Patent
Kreuter et al.

(10) Patent No.: US 6,783,067 B2
(45) Date of Patent: Aug. 31, 2004

(54) PASSPORT PRODUCTION SYSTEM AND METHOD

(75) Inventors: Ruediger Guenter Kreuter, Darmstadt (DE); Dennis James Warwick, Richfield, MN (US); Michael Wriggelsworth, Gross-Umstadt (DE)

(73) Assignee: Datacard Corporation, Minnetonka, MN (US)

( * ) Notice: Subject to any disclaimer, the term of this patent is extended or adjusted under 35 U.S.C. 154(b) by 31 days.

(21) Appl. No.: 09/768,449

(22) Filed: Jan. 24, 2001

(65) Prior Publication Data

US 2001/0045455 A1 Nov. 29, 2001

Related U.S. Application Data

(60) Provisional application No. 60/178,583, filed on Jan. 28, 2000.

(51) Int. Cl.[7] ................................. G06F 7/08
(52) U.S. Cl. ....................... 235/381; 235/487
(58) Field of Search ................. 235/381, 376, 235/380, 462.01, 487, 492; 902/18, 19

(56) References Cited

U.S. PATENT DOCUMENTS

| | | | | |
|---|---|---|---|---|
| 4,184,780 A | * | 1/1980 | Kurihara et al. | 400/56 |
| 4,357,529 A | * | 11/1982 | Atalla | 235/380 |
| 4,597,592 A | * | 7/1986 | Maurer et al. | 283/75 |
| 4,870,258 A | * | 9/1989 | Mochizuki et al. | 235/379 |
| 5,037,216 A | | 8/1991 | Nubson et al. | |
| 5,266,781 A | | 11/1993 | Warwick et al. | |
| 5,897,144 A | | 4/1999 | Uno | |

FOREIGN PATENT DOCUMENTS

| | | |
|---|---|---|
| DE | 38 21 966 | 1/1989 |
| DE | 296 00 787 | 4/1996 |
| DE | 195 37 741 | 4/1997 |
| DE | 195 37 742 | 4/1997 |
| DE | 196 50 312 | 6/1997 |
| DE | 197 09 561 | 11/1999 |
| EP | 0 045 021 | 2/1982 |
| EP | 0 157 858 | 9/1987 |
| EP | 0 157 835 | 6/1988 |
| EP | 0 364 730 A2 | 4/1990 |
| EP | 0 416 489 | 3/1991 |
| EP | 0 266 926 | 8/1992 |
| EP | 0 611 658 | 8/1994 |
| EP | 0 398 516 | 9/1994 |
| EP | 0 398 515 | 3/1995 |
| EP | 0 439 934 | 3/1995 |
| EP | 0 381 137 | 4/1995 |
| EP | 0 490 241 | 6/1995 |
| EP | 0 459 438 | 8/1995 |
| EP | 0 684 588 | 11/1995 |
| EP | 0 432 926 | 4/1996 |
| EP | 0 527 552 | 5/1996 |
| EP | 0 543 291 | 10/1996 |
| EP | 0 503 476 | 6/1997 |
| EP | 0 889 451 | 1/1999 |
| WO | WO 98/39747 | 9/1998 |
| WO | WO 98/41403 | 9/1998 |
| WO | 0221436 | * 3/2002 .......... G06K/19/07 |
| WO | 02089052 | * 11/2002 ......... G06K/19/077 |

* cited by examiner

Primary Examiner—Daniel St. Cyr
(74) Attorney, Agent, or Firm—Merchant & Gould P.C.

(57) ABSTRACT

A passport production system that is designed to personalize passports with the personal information of the intended holder of the passport, as well as an associated method of passport production. The passport production system is modular in construction, thereby readily permitting the assembly and reconfiguration of an application specific passport production system from different processing modules. Moreover, the modules permit the system to be reconfigured at the job site so as to add or remove modules as dictated by the changing needs of the application. In one embodiment, the system includes a leafing module and a personalization module for performing a personalization operation, such as laser personalization or printing on the passport. Documents other than passports can also be personalized using the system and method of this invention.

24 Claims, 20 Drawing Sheets

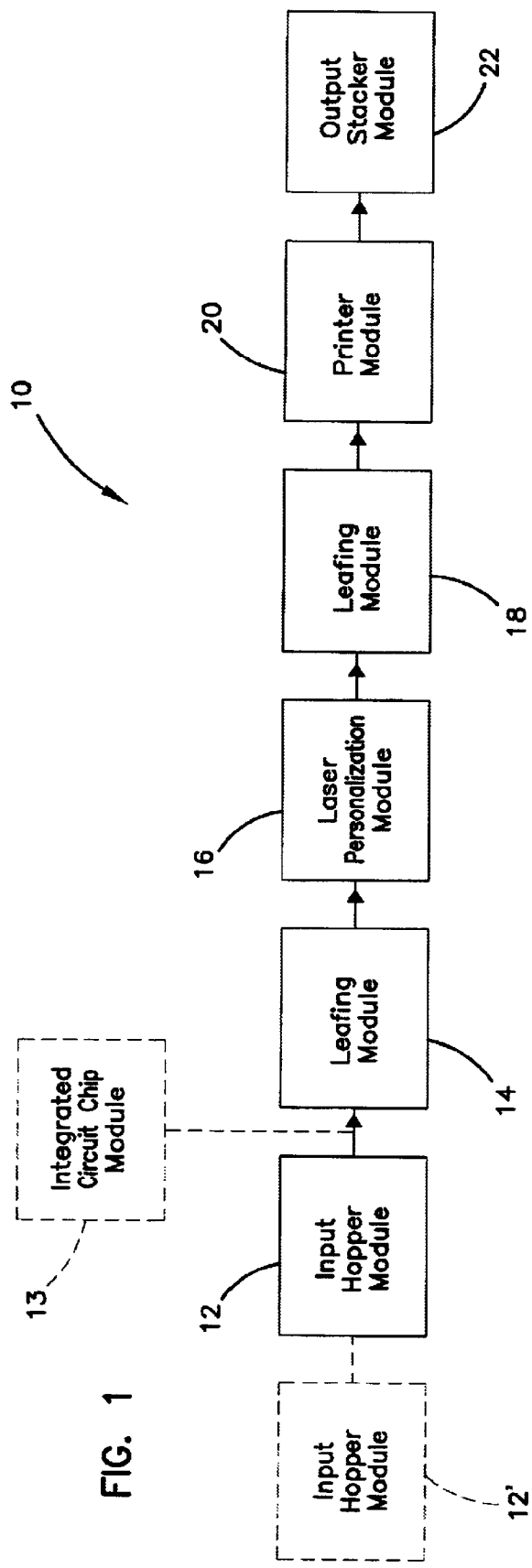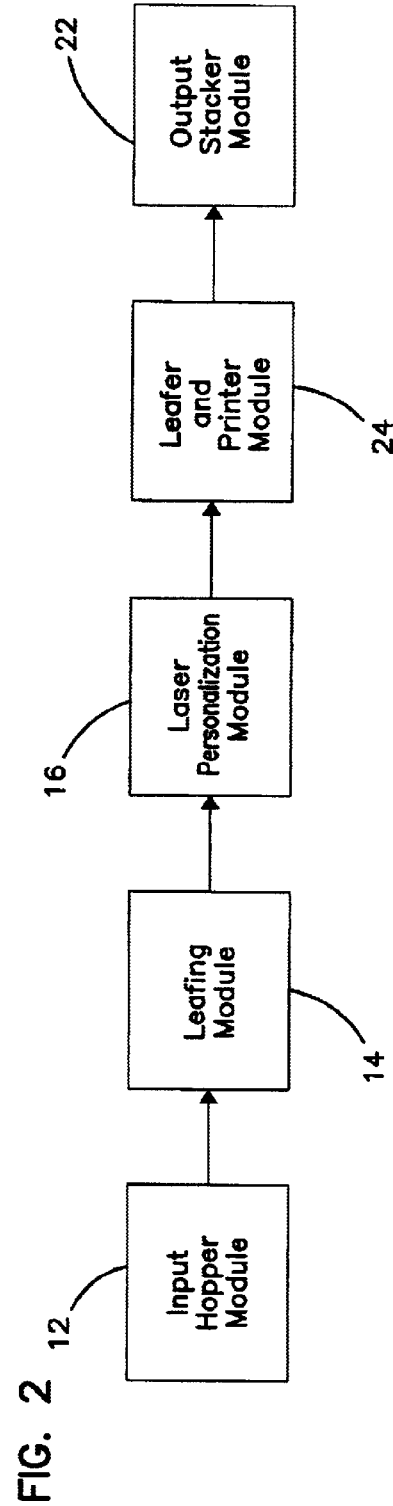

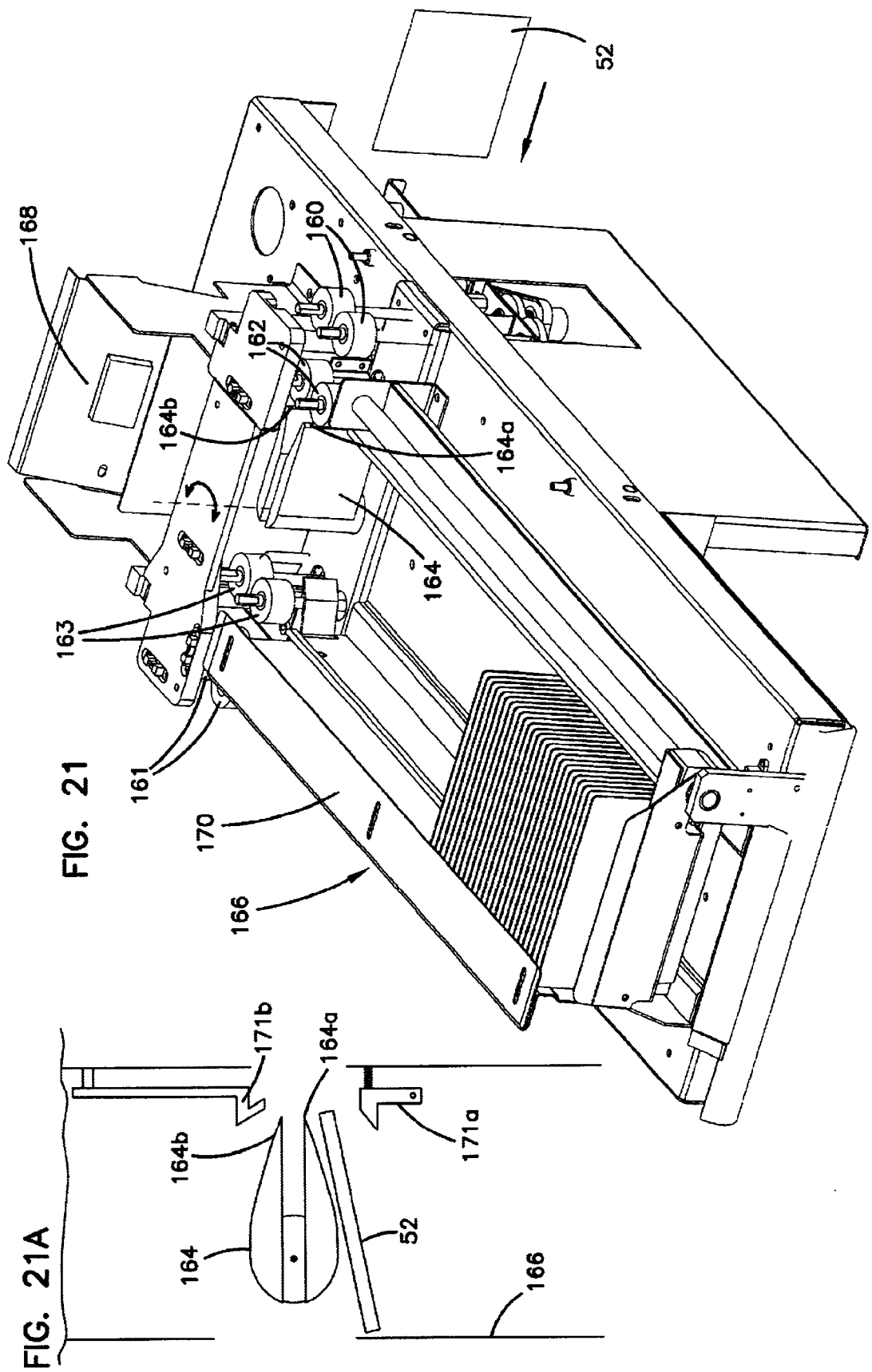

PASSPORT PRODUCTION SYSTEM AND METHOD

This application claims the benefit of U.S. Provisional Application No. 60/178,583, filed Jan. 28, 2000.

FIELD

This invention relates to a system and method for automatically producing secure identity documents. In particular, this invention relates to a system and method for automatically personalizing passports and other secure documents, such as identification cards, as well as printing on and/or personalizing other multiple page, bound documents.

BACKGROUND

Personalization of passports presents unique challenges that are not encountered when personalizing other types of documents. Passports are secure documents and are typically produced in a manner to prevent forgeries and duplications. There is an international standard (International Civil Airline Organization 9303-1 and ISO/IEC 7501-1) that defines certain attributes of, and provides suggestions for the layout of, a passport. However, each country may have different requirements as to what information, images, data, etc. are included in a passport, and on which particular page of the passport this information is placed.

It would be advantageous to be able to automatically personalize passports in a faster time, with minimal, or no, intervention and handling by an operator. This would enable faster production time, reduce operator error, improve security, and reduce production costs. Any such system must take into account the unique characteristics of a passport, such as preexisting serialization or printed information, security features, information placement on different pages, and the different number of pages that are present in passports.

Machines that personalize passports are known. These previous machines have included laser engraving capability, but have not included leafing (i.e. page turning) capability. In these machines, the passports are presented individually by hand to the machine, with the passports opened by the operator to the appropriate page for laser engraving of that page. These machines have limited throughput capability, as well as security issues and increased error rates due to operator interaction, making them inadequate for secure, high volume production of passports. In addition, due to the interaction by the operator, passport security issues are present as are increased error rates.

Therefore, there is a need for a system and method for personalizing passports that is fully automated, thereby enabling operation with minimal or no intervention and handling by an operator, as well as enabling significantly higher rates of passport production.

SUMMARY

The invention provides a system that is designed to personalize identity documents, such as passports and other multiple page bound documents. For passport production, the system personalizes each passport with the required information of the intended holder of the passport. The invention also provides a method of producing identity documents such as passports. Required information for passport production can include personal biographic data about the passport holder, information concerning the passport holder's family members, emergency information, document holder authentication information, document authentication features, validity period, work status, etc. The system can also gather information contained on the passport, such as serial number information or pre-printed registration marks for alignment of personaliation information. Detection, or the lack thereof, of this information provides further security.

The system eliminates the need for an operator to do many of the steps of passport personalization required by previous machines, such as reading numbers, opening to certain pages, aligning passports with printers, etc. However, operator intervention is required for loading and unloading passports from the input module and the output module, and to clear jams should they occur.

The system is preferably modular in construction, thereby readily permitting the assembly and reconfiguration of an application specific production system from different processing modules. The modules can be built and tested prior to configuration into the system. In fact, the modules can be built, tested, packaged and shipped to a job site prior to assembly into a system. Moreover, the modules permit the system to be reconfigured at the job site so as to add or remove modules as dictated by the changing needs of the application.

In one embodiment of the invention, a system for personalizing a multiple page, bound document is provided. The system comprises a leafing mechanism constructed to receive the bound document in an open or closed configuration. The leafing mechanism includes an apparatus for turning pages of the document. The system further includes a personalization mechanism that is disposed either downstream or upstream from the leafing mechanism and which is capable of performing a personalization operation on a page of the document.

In a preferred embodiment of the invention, the leafing mechanism and personalization mechanism are constructed as separate modules. The personalization module can be either a laser personalization module or a printer module. The printer module can include an integral leafing mechanism built therein. Additional modules can be used within the system as well for performing additional functions. For instance, a second leafing module, one or more input and output modules, an integrated circuit chip module, and one or more additional laser personalization modules and/or printer modules, can be included within the system. A leafing mechanism, such as a leafing apparatus built into the particular personalization module or a separate leafing module, is preferably upstream of each personalization mechanism to permit turning to the appropriate page requiring the next personalization operation.

In another embodiment of the invention, a method of personalizing a multiple page, bound document is provided. The method comprises inputting a bound document in an open or closed configuration into a leafing mechanism, turning to a preselected page using the leafing mechanism, inputting the document into a personalization mechanism, and performing a personalization operation on the preselected page.

For a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

FIG. 1 is a schematic illustration of the passport production system in accordance with the invention.

FIG. 2 is a schematic illustration of an alternate passport production system.

FIG. 21 is a perspective view of the output stacker mechanism.

FIG. 21A is a top view of the gate in the output stacker mechanism.

DETAILED DESCRIPTION

Figure 3:
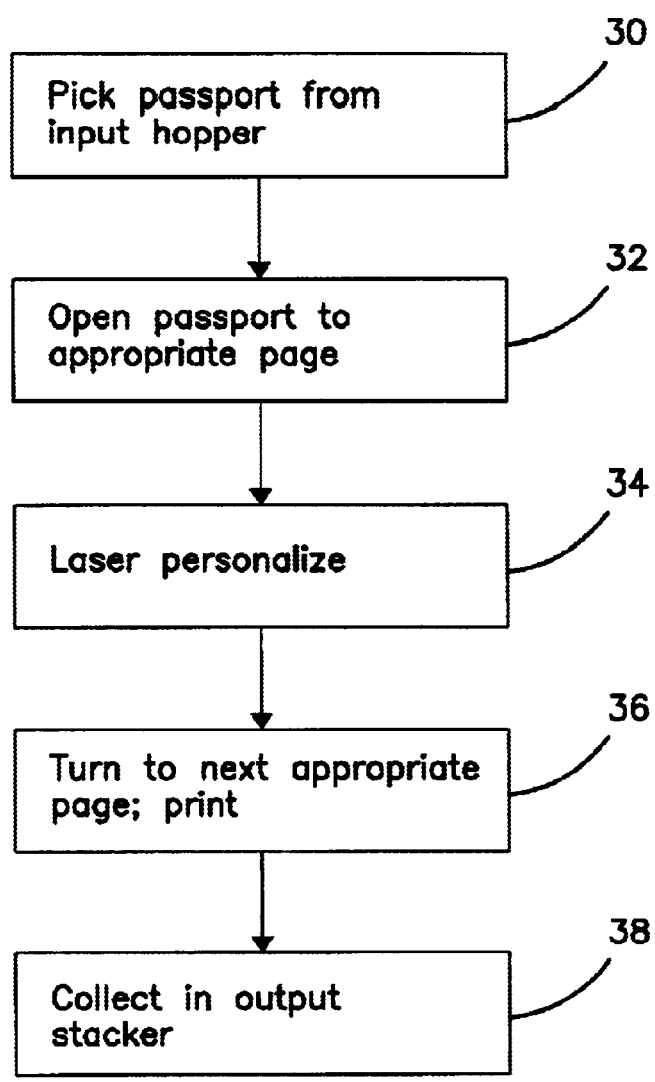
FIG. 3 is a flow chart of steps in the passport production method.

A preferred embodiment of a passport production system 10 according to the invention is schematically illustrated in FIG. 1. The system 10 includes an input hopper module 12, a leafing module 14, a laser personalization module 16, a second leafing module 18, a printer module 20 and an output stacker module 22. The leafing modules 14 and 18 are preferably of the same design, although the design can be different if desired. As shown in FIG. 2, the leafing module 18 and the printer module 20 are preferably combined into a single module 24 that performs the functions of both the leafing module 18 and the printer module 20.

The modular nature of the system permits other processing modules to be used in addition to the above described modules. For instance, an image perforation module for putting holes in one or more of the passport pages can be optionally employed in addition to the laser personalization module 16. In addition, an integrated circuit chip module 13, shown in dashed lines in FIG. 1, for programming an integrated circuit chip, either of the contact type or of the contactless type, that is mounted to a page of the passport can be provided. The module 13 is preferably one of the first modules in the system 10 to permit an initial determination of whether the integrated circuit chip is functioning. If it is determined that the chip is not functioning, there is no need to perform other personalization procedures on the passport and the passport can be passed through the system to a passport reject location. Rather than using a separate module, the integrated circuit chip programming apparatus can be built into one of the other modules, such as the leafing module 14 or the laser personalization module 16.

Other modules can include an encoding module for encoding a magnetic stripe on one or more of the pages of a passport, and/or an embossing module for performing embossing operations on one or more passport pages. A vision module that is provided with a camera system for displaying an image of one or more of the personalized passport pages can also be provided. Display of the image by the vision module permits a check of the quality and accuracy of the personalization on each page, as well as functioning as part of an alignment system for achieving alignment of the passport page and the respective personalization module. A similar vision system is disclosed in copending U.S. patent application Ser. No. 09/362,197.

Moreover, the system 10 can be configured with one or more of any of the modules described herein (e.g. two input hopper modules, three laser personalization modules, etc.), and the modules can be physically arranged in any order. However, for each module that performs a personalization function on a page of the passport that is different from the preceding module, there is preferably a leafing module (or else leafing capability must be built into the module) associated with each module for turning to the correct page.

The input hopper module 12 is designed to hold a plurality of passports therein waiting to be personalized. The passports are held in a closed configuration in the module 12, with the spines of the passports oriented either upward or downward. In the preferred arrangement, the spines are oriented downward. Further, the passports are preferably oriented so that the front of each passport faces forward. The input hopper module 12 is capable of picking a single passport for transport to the next module.

The leafing module 14 receives the closed passport from the input hopper module 12 (or other type of module), and turns the pages of the passport to the appropriate page. A suitable system is provided within the module 14 so that the module 14 knows which page to turn to. For instance, an optical system that reads a passport number on each page can be utilized to detect the passport pages. The module 14 includes page turning capability to turn the pages of the passport, and a suitable system to enable the module 14 to determine when the desired page has been reached. The leafing module 14 further has the capability of closing an opened passport and transporting the closed passport to the next module.

Once the appropriate page is reached, the passport is transported to the laser personalization module 16 where the page is personalized. The laser personalization module 16 is provided with a laser system capable of performing laser personalization. Laser personalization as used herein includes engraving, perforating, and bubbling a suitable page of the passport using the laser system. The laser system within the module 16, in the preferred embodiment, is a dual laser system that enables an approximate doubling of the speed of the laser personalization process compared to a system where only one laser is used.

After laser personalization is complete, the passport may be transported, opened or closed, to the next module, such as the leafing module 18/printer module 20 (or the combined leafer and printer module 24). The passport is turned to the page(s) where printing is to occur, and then the printer performs a printing operation. If printing is not necessary, the passport can be transported through the module without printing.

After printing, and if no further personalization operations are necessary, the personalized passport may be closed and then transported to the output stacker module 22 where it is stacked with other, previously personalized passports. Alternatively, the module 22 can direct the passport to a reject location if it is determined that the passport has been improperly personalized, a bad integrated circuit chip is present, or another defect, either in the personalization processing or in the passport material, is detected.

FIG. 3 illustrates exemplary steps in the method of passport production according to the invention. After the input hopper module is loaded with passports to be personalized and the system controller has been set-up with the necessary information concerning the personalization operations to be performed on the passports, one of the passports is picked from the front of the stack in the input hopper module at step 30. The passport is transported to the leafing module 14, and at step 32, the passport is turned to the appropriate page. Once the passport is turned to the correct page, the passport is transported to the laser personalization module, where the appropriate page is laser personalized 34. After laser personalization, the passport is transported to the next module. If printing is necessary, the passport is turned to the appropriate page and printing occurs 36. After printing (or after laser personalization if printing is not necessary), the passport is closed, and the passport is then transported to the output stacker module where it is collected 38 with other personalized passports.

The terms "passport" and "book" are used interchangeably herein to refer to a passport provided with cover pages and a plurality of internal pages. In a typical passport, the cover pages are generally formed from a thick paper material, while the internal pages are formed from a thinner paper material. Thus, as used herein, the term "page" is intended to encompass a cover page as well as an internal page.

In addition, a polycarbonate page of known construction is suitably secured to the inside surface of one of the cover pages. Laser personalization, including engraving, perforation and bubbling, occurs primarily on the polycarbonate page, although laser personalization in the form of perforation can occur on the internal paper pages as well. Printing occurs on the internal paper pages, and not on the polycarbonate page which is not generally receptive to printing. The number of pages, and the resulting thickness, of a passport, varies by country, and the system 10 is designed to account for the differing passport thickness used by each country.

Mechanical Construction

Figure 4:
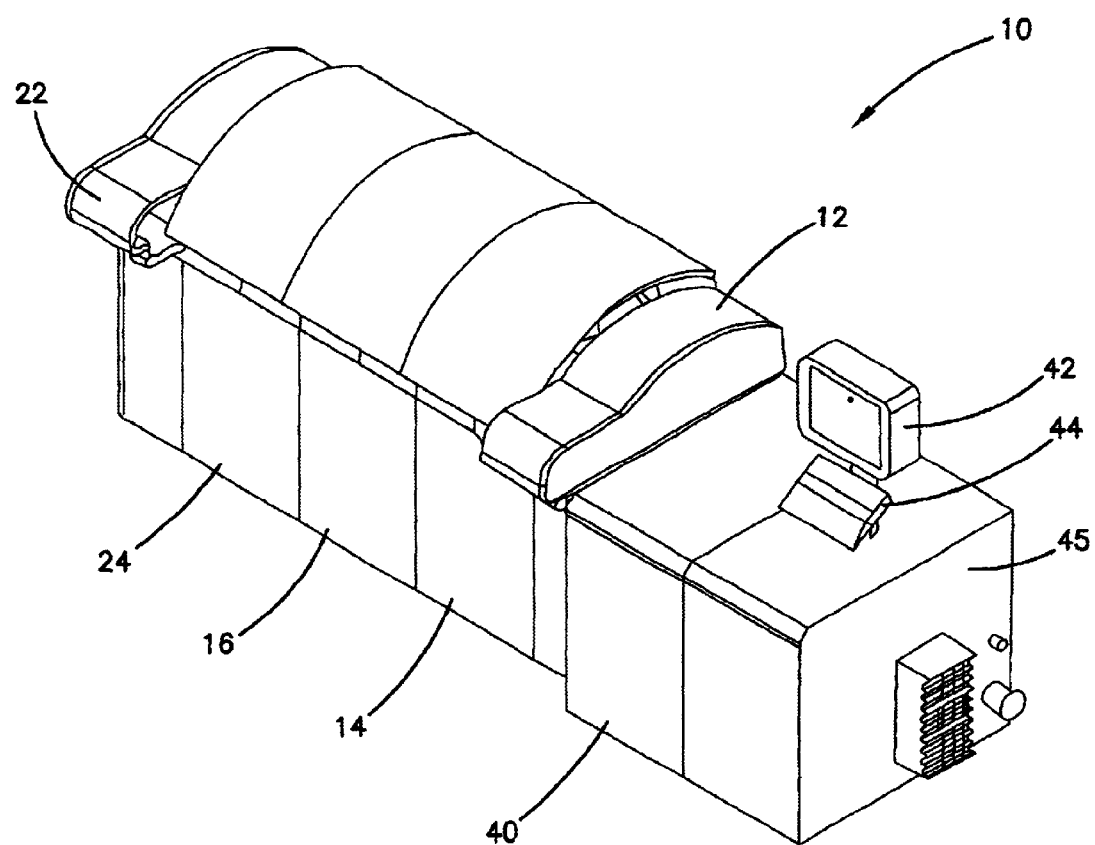
FIG. 4 is a perspective view of a modular passport production system in accordance with the invention.

Turning now to FIGS. 4–21, the mechanical construction of one implementation or embodiment of the passport production system 10 will now be described. FIG. 4 illustrates the system 10 including the input hopper module 12, the leafing module 14, the laser personalization module 16, the combined leafer and printer module 24, and the output stacker module 22. As described earlier, the module 24 could consist of a separate leafing module 18 and a separate printer module 20. The system 10 further includes a system controller 40 which controls operation of the system 10, a CRT display 42 for displaying system information and a keyboard 44 for entering control inputs. The keyboard 44 can be provided with biometric authentication capability so that only authorized personnel can operate the system 10. An additional cabinet 45 is provided that holds laser support equipment, such as laser power supplies, for operating the laser personalization module 16. An additional CRT display and input device (not shown) can be provided on the cabinet 45 for use in implementing a camera alignment system described later herein. Each of the modules in the system 10 can be provided with a global positioning (GPS) mechanism to deter theft of the modules. The GPS mechanism would disable its respective module and prevent its operation if the module were moved too far from a predetermined location.

Figure 5:
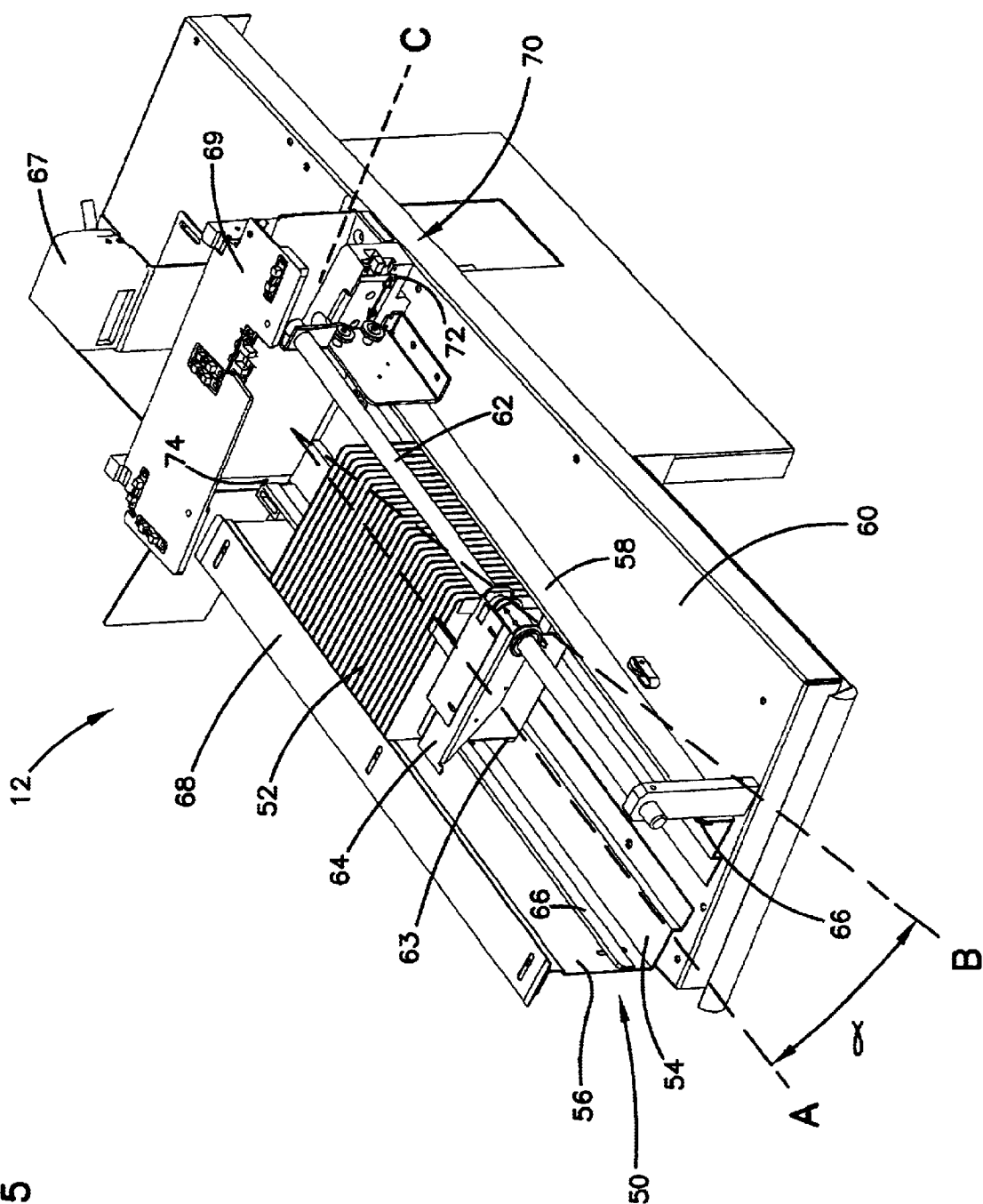
FIG. 5 is a perspective view of the input hopper mechanism.

Turning to FIG. 5, the input hopper module 12 is shown to include a passport receptacle 50 for holding a plurality of passports 52. The receptacle 50 includes a bottom support plate 54 with side rail members 66, a first side wall 56 and a second side wall 58. The bottom support plate 54 is fixed on a support table 60 fixed within the module 12. A rod 62 extends along the length of the support plate 54, parallel to the side wall 56, and a pusher plate 64 is sidably supported on the rod 62 for sliding movements therealong. A support bearing 63 is mounted on the lower end of the pusher plate 64 and rolls along the top surface of the bottom support plate 54 to rotationally support the pusher plate 64 as it rests against the passports 52. The pusher plate 64 is moveable in the direction of the axis A. The pusher plate 64 is preferably biased by a suitable biasing mechanism, such as a spring, toward the passports 52, so that the passports 52 are constantly urged toward a discharge position. In the preferred embodiment, a retention plate 68 is fixed to the top of the side wall 56 such that the plate 68 is disposed closely adjacent to the upper edges of the passports 52 in order to keep the passports from sliding upward away from the bottom support plate 54.

Figure 5B:
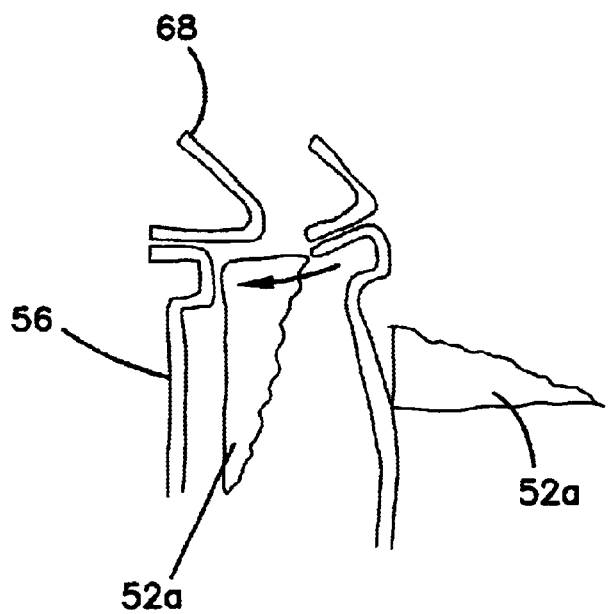
FIG. 5B illustrates the spring loaded hold down for the passports.

In the preferred embodiment, the side wall 56 is flexibly mounted and biased toward the passports 52 so that during the loading of additional passports 52athe side wall 56 moves away from the passports 52 as the additional passports 52a are moved downward onto the receptacle 50, as shown in FIG. 5B. Instead of being flexible, the side wall 56 and plate 68 can be mounted so as to slide sideways when loading passports.

Figure 5A:
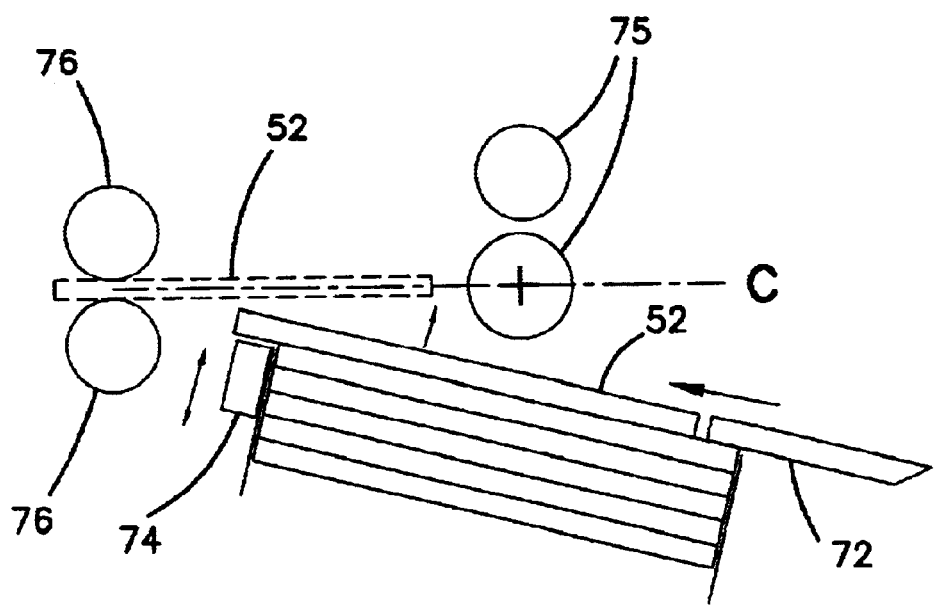
FIG. 5A illustrates the entry of a picked passport into transport rollers.

A picker mechanism 70 is disposed adjacent to the forward end of the receptacle 50 for picking one of the passports 52. The picker mechanism 70 includes a picker 72 that is actuatable in the direction of the arrow in FIG. 5. The picker 72 is designed to engage with and drive the forwardmost passport 52 toward and past the end of a stop bar 74 and into transport rollers 76, shown in FIG. 5A, for transport to the next module. As evident from FIG. 5, the receptacle 50 is disposed at an angle α to a centerline B of the table 60. Therefore, the movement of the passport 52 as it is picked by picker 72 is disposed at an angle to a transport direction C (see FIG. 5A). When the leading edge of the passport 52 is driven into the nip of the rollers 76, the back end of the passport will be swung in a counterclockwise direction as viewed in FIG. 5A, thereby bringing the passport 52 into alignment (shown in dashed lines in FIG. 5A) with the transport direction C.

Disposing the receptacle 50 at an angle is important as it places the passports 52 initially out of the transport path C, but at the same time directs the passport 52, as it is picked, toward the nip of the transport rollers 76. Disposing the receptacle 50 at an angle also allows for the inclusion of intermediate transport rollers 75 for the purpose of moving the passport 52 from the right side of the input hopper module 12 to the transport rollers 76. This arrangement provides for a transport path very close to the axis C for most reliable movement of the passport 52. Since the passports 52 or picker mechanism 70 do not block the transport path C, one or more additional input hoppers 12' (shown in dashed lines in FIG. 1) can be utilized upstream of the input hopper 12. The passports from the additional upstream hopper(s) can therefore be fed along the transport path C without interference from the passports 52 in the hopper 12.

After a passport 52 is picked from the input hopper 12, the passport 52 is transported by the rollers 76 and other suitable transport mechanisms to the leafing module 14. As indicated above, the passports 52 are disposed within the hopper 12 with their spines facing downward, so that they are transported to the leafing module with their spines oriented downward.

Another feature of the input hopper module 12 is the ability to read a barcode or other symbol on the passport 52 while the passport 52 is still in the receptacle 50 and before picking takes place. A barcode reader 67 or other symbology recognition device is disposed adjacent to the passport path so that the reader 67 is able to read a barcode placed on a portion of the passport that is near an upper guide 69. It is also possible to read a barcode on the passport 52 after it has been picked from the receptacle 50, or to read a passport that has been received from an upstream module and is in the process of being transferred through the input hopper module 12.

Various sizes of passports 52 are accommodated by the input hopper module 12 by adjusting the distance between the side rail members 66, by adjusting the distance between the upper guide 69 and table 60, and by adjusting the position of the stop bar 74 relative to the forwardmost passport 52.

FIGS. 6–9 illustrate the details of the leafing module 14. The leafing module 14 generally includes a transport and support mechanism 80 (FIGS. 6 and 7) and a page turning mechanism 82 (FIGS. 8 and 9) that function together to open the passport 52 to the appropriate page. The transport and support mechanism 80 includes a set of input rollers 84 that receive the passport 52 and feed it into the leafing module 14. A wall 86 is disposed downstream from the rollers 84. The wall 86 provides a surface against which the passport 52 is pressed during the passport opening and page turning procedures. A drive belt 88 extends around a pulley 89 adjacent to the input rollers 84, the wall 86 and a pulley 90 disposed at the opposite end of the wall 86. The belt 88 further extends around a drive pulley 92 that is driven by a motor 94 whereby the belt 88 is driven by the motor 94. A tab 96 extends from the belt 88, and is provided to engage the trailing edge of the passport 52 after the rollers 84 substantially drive the passport 52 into the leafing module 14. The belt 88 and the tab 96 take the passport 52 from the rollers 84 and drive it into position in front of the wall 86.

Figure 6:
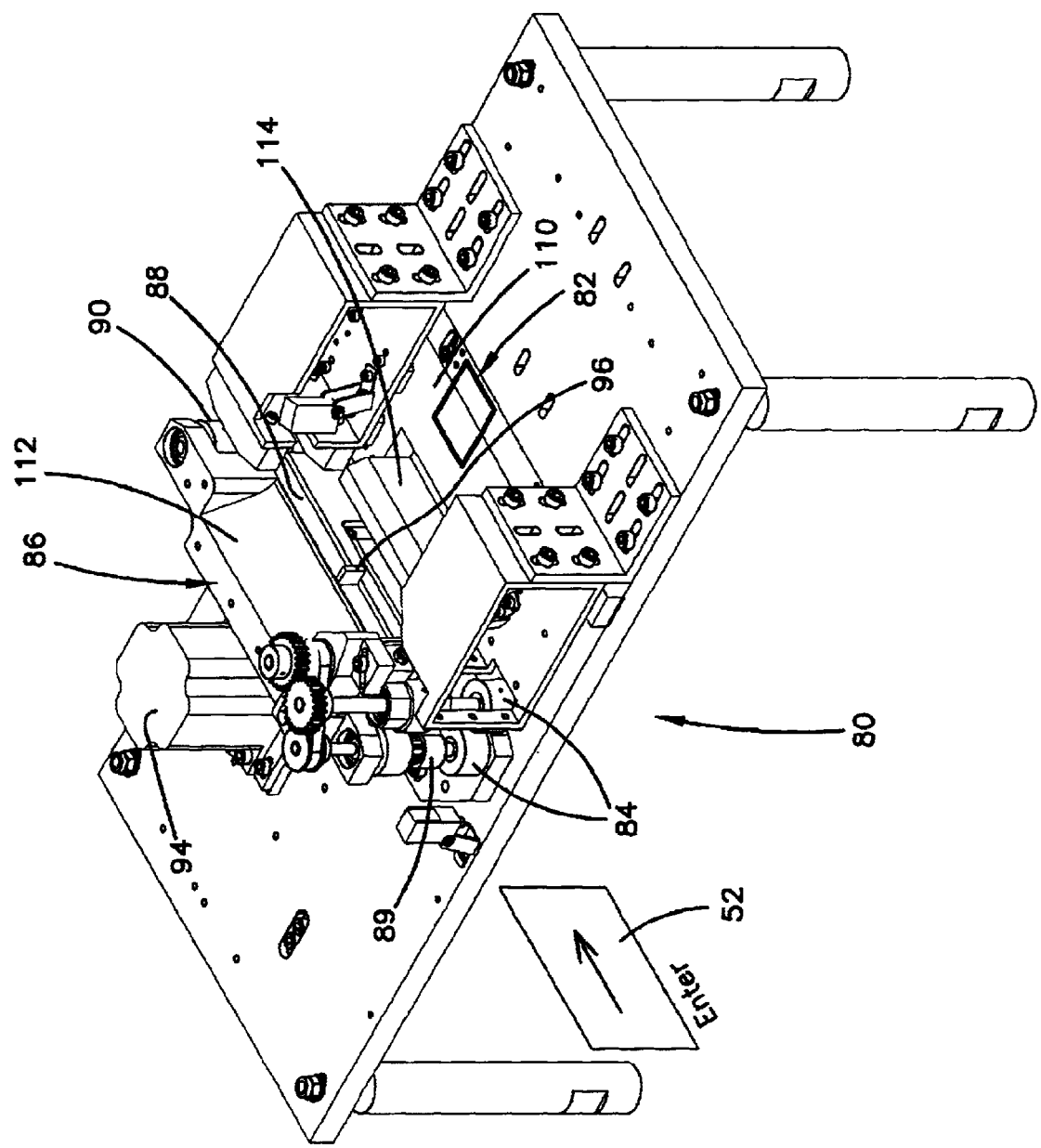
FIG. 6 is a perspective view of the transport and support mechanism used in the leafing module.
Figure 7:
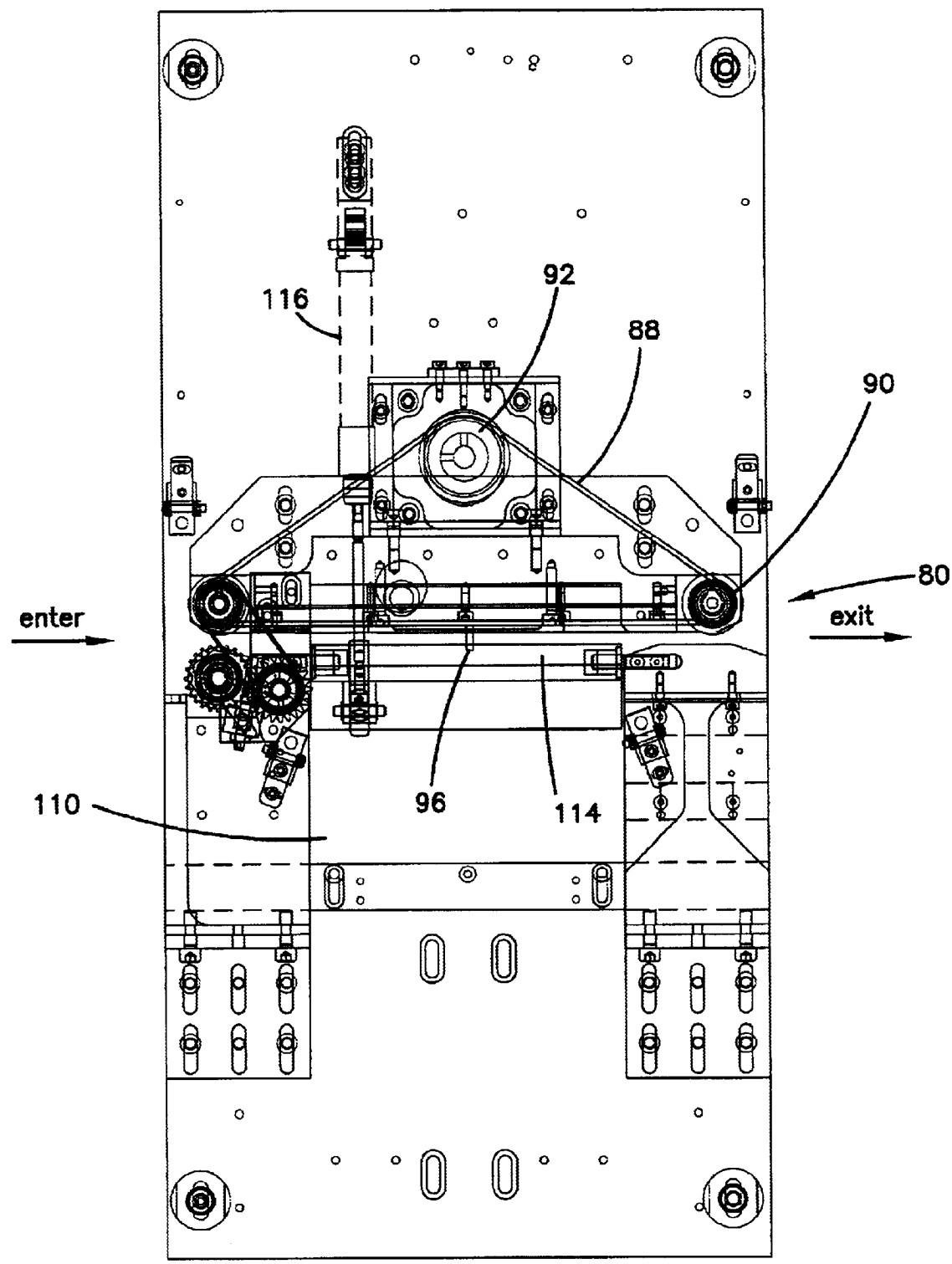
FIG. 7 is a top view of the transport and support mechanism used in the leafing module.
Figure 9:
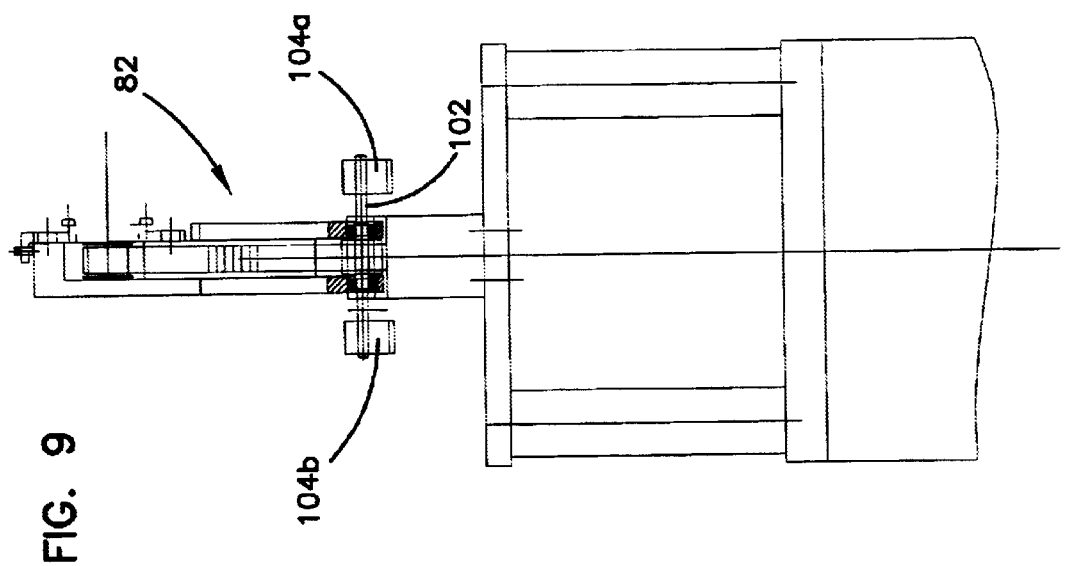
FIG. 9 is a view of the page turning apparatus looking in the direction of line 9—9 in FIG. 8.
Figure 8:
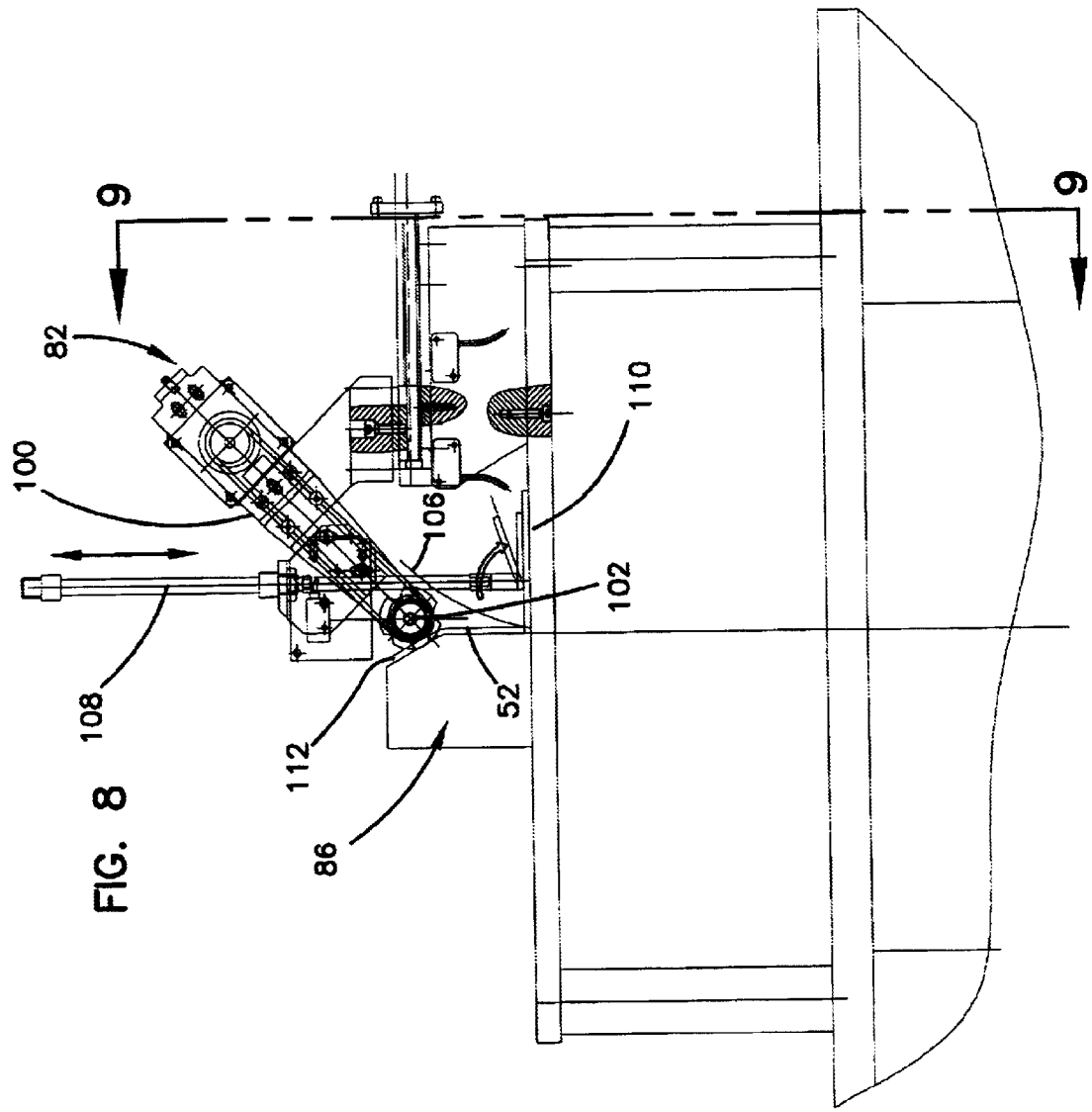
FIG. 8 is an end view of the page turning mechanism within the leafing module.

As shown diagrammatically in FIG. 6, the page turning mechanism 82 is positioned generally opposite the wall 86. With reference to FIGS. 8 and 9, the page turning mechanism 82 includes an arm 100 that extends toward the wall 86. At the end of the arm 100 adjacent the wall 86, a shaft 102 is rotatably mounted. An eccentric roller 104a, 104b is mounted at each end of the shaft 102. As shown in FIG. 9, each of the rollers 104a, 104b includes an eccentric portion that extends farther away from the axis of the shaft 102 than the opposite portion of the rollers 104a, 104b, whereby during one revolution of the rollers 104a, 104b, the eccentric portion thereof will engage with the passport 52 and "pick-up" the cover page or one internal page 106 thereof. However, since the rollers 104a, 104b are eccentric, the opposite side of each roller 104a, 104b will rotate past the passport without engaging any additional pages of the passport 52 while the page just "picked-up" is being moved to the other side of the rollers 104a, 104b. In this way, only a single page is turned with each revolution of the rollers 104a, 104b. Therefore, during each revolution, the rollers 104a, 104b pick up the passport cover page or one internal page to start the passport page turning procedure. As evident from FIG. 8, the passport is oriented generally vertically against the wall 86, and the internal pages or cover page thereof are picked-up by the rollers 104a, 104b and moved downward toward a table 110.

The page turning mechanism 82 also includes a press mechanism 108 that is vertically moveable up and down as indicated by the arrow in FIG. 8. The press mechanism 108 is intended to press the page(s) 106 (or the passport cover page) downward against the table 110 after the page(s) 106 has been picked-up by the rollers 104a, 104b. Thus, the press mechanism 108 is initially raised upward, and then the rollers 104a, 104b pick-up the page 106, and then the press mechanism 108 is moved down to force the passport 52 to an open position. The press mechanism 108 is actuated after the desired number of pages have been turned just prior to sending the passport 52 to the next module. Alternatively, the arm 100 and attached rollers 104a, 104b could provide the function of opening the book by moving the arm 100 away from the angled surface 112 and then down towards the table 110, and would eliminate the need for the separate press mechanism 108. FIG. 8 shows the wall 86 as including an angled surface 112 against which the edge of the passport (i.e. the edge opposite the spine) is pressed. The angled surface 112 facilitates the opening and page turning functions by making it easier for the rollers 104a, 104b to "pick-up" one page at a time.

If for any reason the passport 52 needs to be closed, a bar 114 (best seen in FIG. 6) is pivotally mounted on the table 110 for movement between the vertical position shown in FIG. 6 and a horizontal position flush with the table 110. The bar 114 is actuated by an actuator 116, shown in dashed lines in FIG. 7, disposed underneath the table 110. During page turning, the bar 114 is positioned as shown in FIG. 6 so that the passport is clamped in the area of the spine. During the opening procedure and when the passport 52 is transported into or through the leafing module 14, the bar 114 is flush with the table 110. To close the passport 52, the turning mechanism 82 is moved away from the passport 52 so that the pages of the passport can pivot up, and the bar 114 is pivoted upward to its vertical position by the actuator 116, which forces the passport 52 to a closed position.

The leafing module 14 is capable of turning to any page within the passport 52. Preferably a camera system built into the leafing module is used to read a marker, such as passport number, provided on each page. The passport number can be either punched or printed onto each page. The passport number is preferably used as a key by the system to capture personal data keyed to the passport number that is suitably stored by the system for later use in the laser personalization process. A marker other than a passport number can be read by the camera system, as long as the marker provides an indication of the particular page, so that when the marker is read, the system knows which page is open. The ability to be able to ascertain the page number and to turn to any page is important, since each application may have unique passport requirements. For instance, one application may require that page 3 of the passport 52 be provided with a laser engraved image, while a second application may require that the laser engraved image be provided on a different page. Therefore, the leafing module 14 must be able to turn to the appropriate page.

Once the passport 52 has been opened to the appropriate page, the belt 88 is again driven to drive the now opened passport 52 out of the leafing module 14 and to the laser personalization module 16 for laser personalizing the page. The leafing module 14 is designed to permit exit of the opened passport without interfering with the passage thereof. In addition, the passport can be transferred through the leafing module 14 either in an open or closed configuration, without turning any pages thereof.

Figure 10:
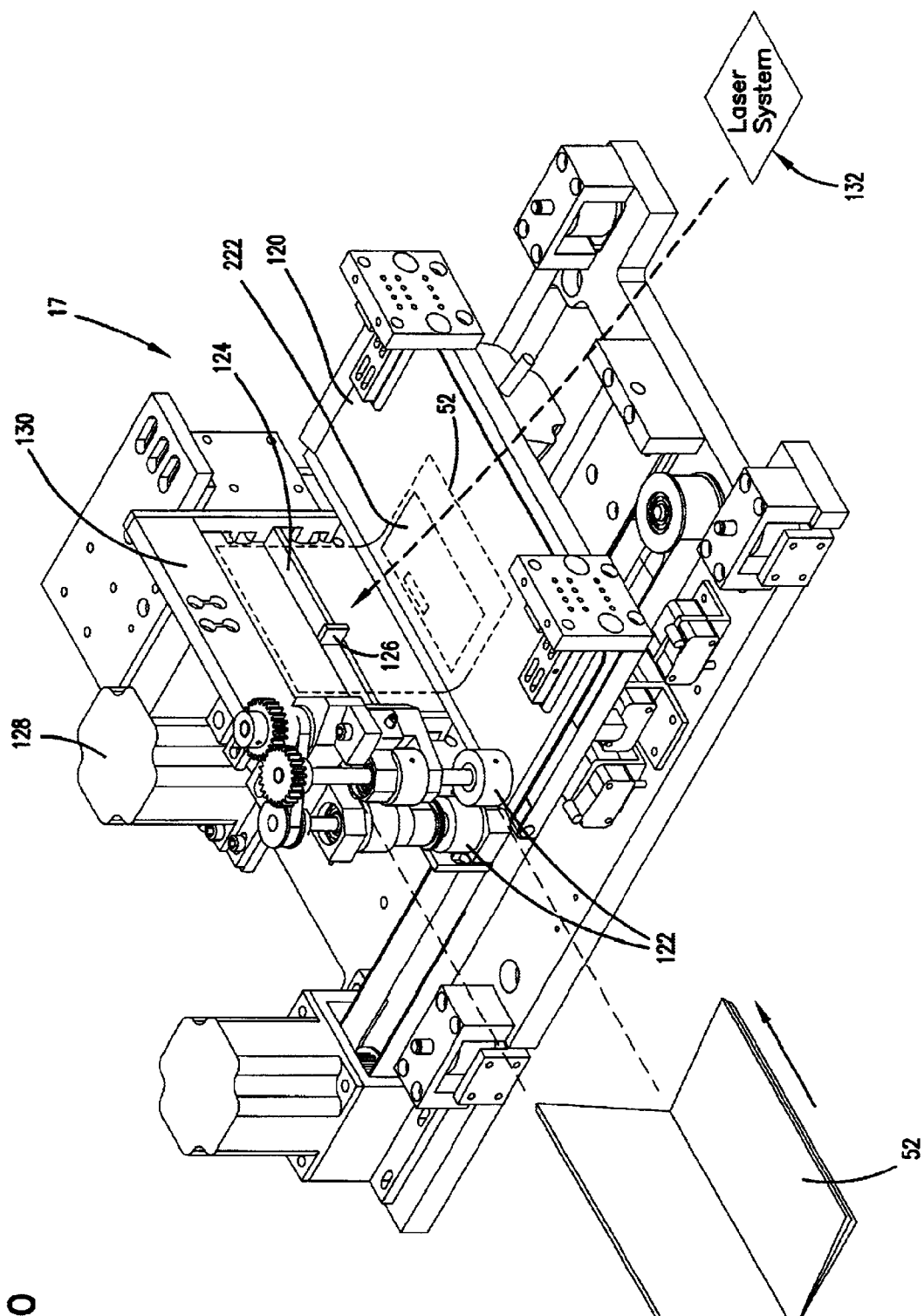
FIG. 10 is a perspective view of a portion of the laser personalization apparatus within the laser personalization module.

FIG. 10 illustrates a portion of the laser personalizing mechanism 17 used in the laser personalization module 16. The laser personalization mechanism 17 includes a support table 120 for supporting the horizontal part of the opened passport 52, input rollers 122, and a belt 124 and tab 126 similar to the belt 88 and tab 96 used in the transport and support mechanism 80 of the leafing module 14. The input rollers 122 serve to drive the opened passport into the laser personalization module 16, with the belt 124 and tab 126 functioning to position the passport 52 centrally on the table 120 as shown in dashed lines in FIG. 10. The tab 126, like the tab 96, engages the trailing edge of the passport 52 to push it into position. The belt 124 is driven by a motor 128 mounted on the table 120. A wall 130 extends upwardly from the table 120 for supporting the vertical part of the opened passport 52.

Figure 10A:
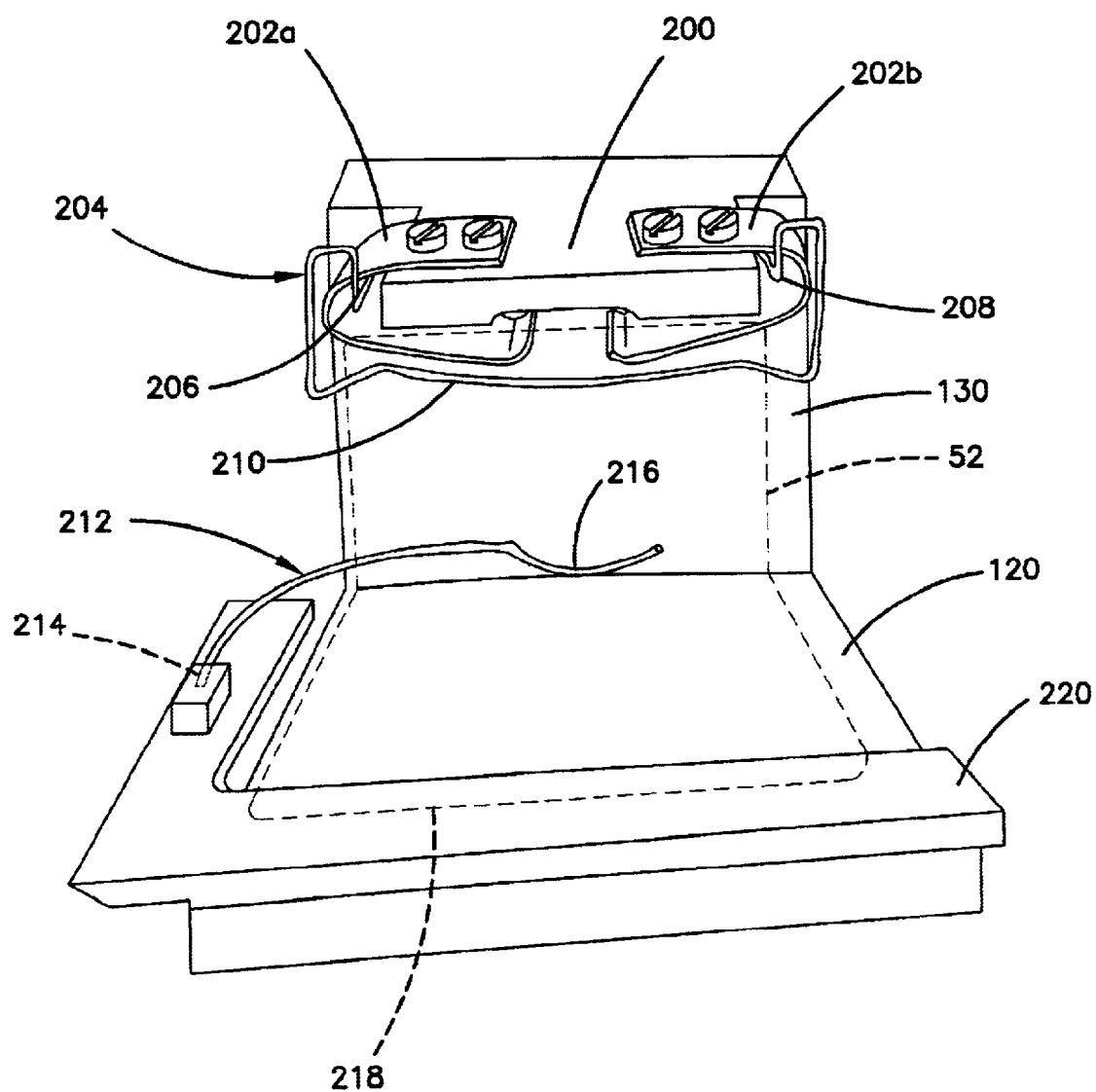
FIG. 10A is a top perspective view illustrating springs holding a passport in place during laser personalization.

FIG. 10A illustrates a system for holding the passport 52 in place during laser personalization. The wall 130 includes a flange 200 adjacent the top thereof. Mounted to the flange 200 are a pair of flat spring elements 202a, 202b, each of which are connected at one end to the top of the flange 200, with the opposite free ends curling around the end of the flange 200 and extending underneath the flange 200. The spring elements 202a, 202b are designed to engage the top edge of the vertical portion of the open passport 52 and hold the passport 52 down against the table 120 during personalization. A spring element 204 in the form of a wire has opposite ends 206, 208 suitably fixed to the spring elements 202a, 202b (or to the flange 200), and a central pressing portion 210. The spring element 204 is constructed and positioned so that the pressing portion 210 presses the vertical portion of the opened passport back against the wall 130. Another spring element 212 includes an end 214 that is fixed to the table 120 and a free end region 216 that is constructed and positioned to press the bottom region of the vertical portion of the opened passport 52 back against the wall 130, as well as hold the passport 52 down against the table 120.

The spring elements 202a, 202b, 204 and 212 thus hold the passport 52 in position during laser personalization, thereby improving the personalization process. The spring elements 204, 212 adjacent the entrance end of the table 120 and wall 130 are designed to permit the vertical portion of the opened passport to slide behind the spring elements 204, 212 when the opened passport is driven into the module 16. Further, the spring elements 204, 212 readily permit the tab 126 on the belt 124 to drive the passport from the module once laser personalization is completed. As further shown in FIG. 10A, an edge 218 of the horizontal portion of the passport slides underneath a ledge 220 provided on the table 120 as the opened passport is driven into the module 16. The ledge 220 prevents the edge 218 of the passport from popping upward.

Figure 11:
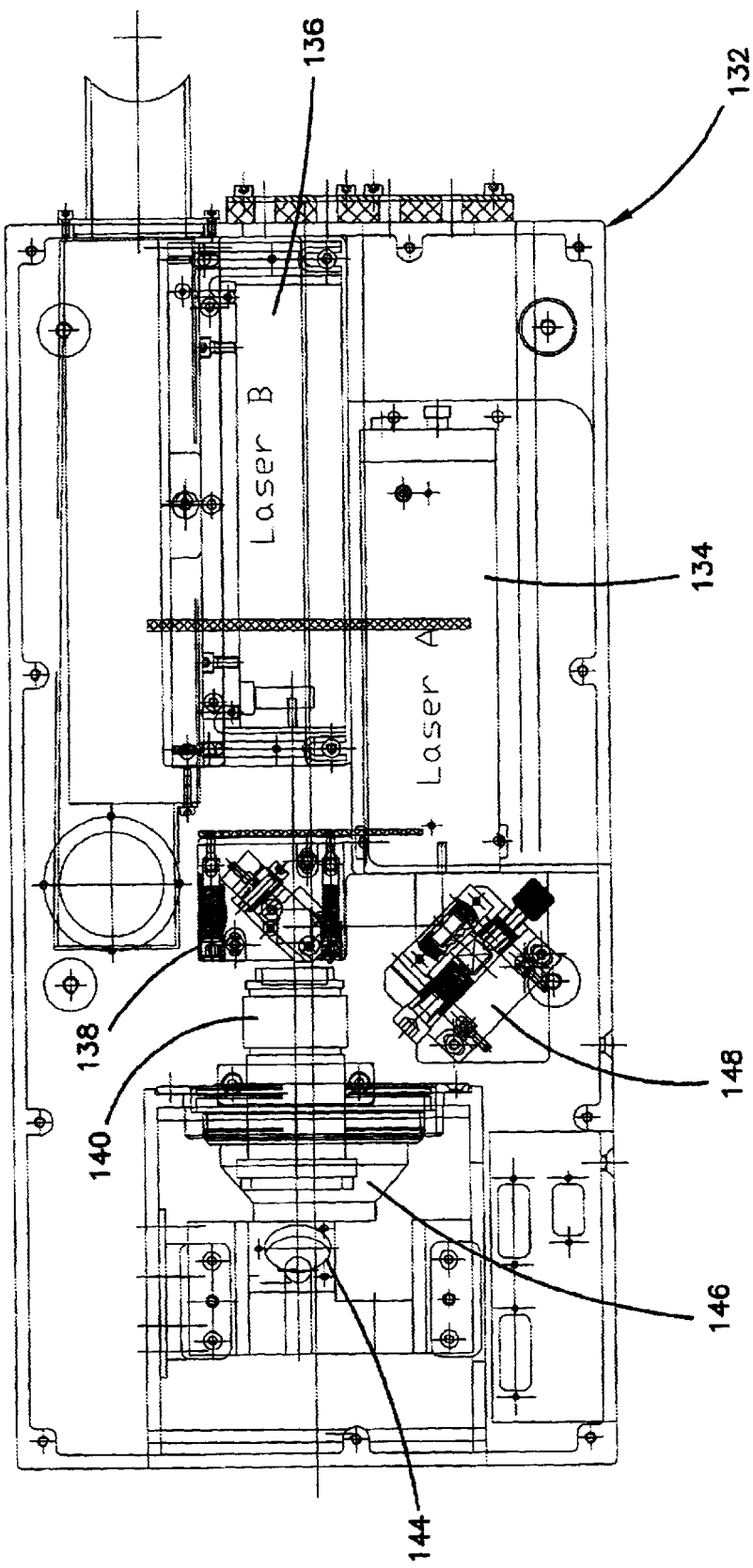
FIG. 11 is a top view of the laser system.
Figure 12:
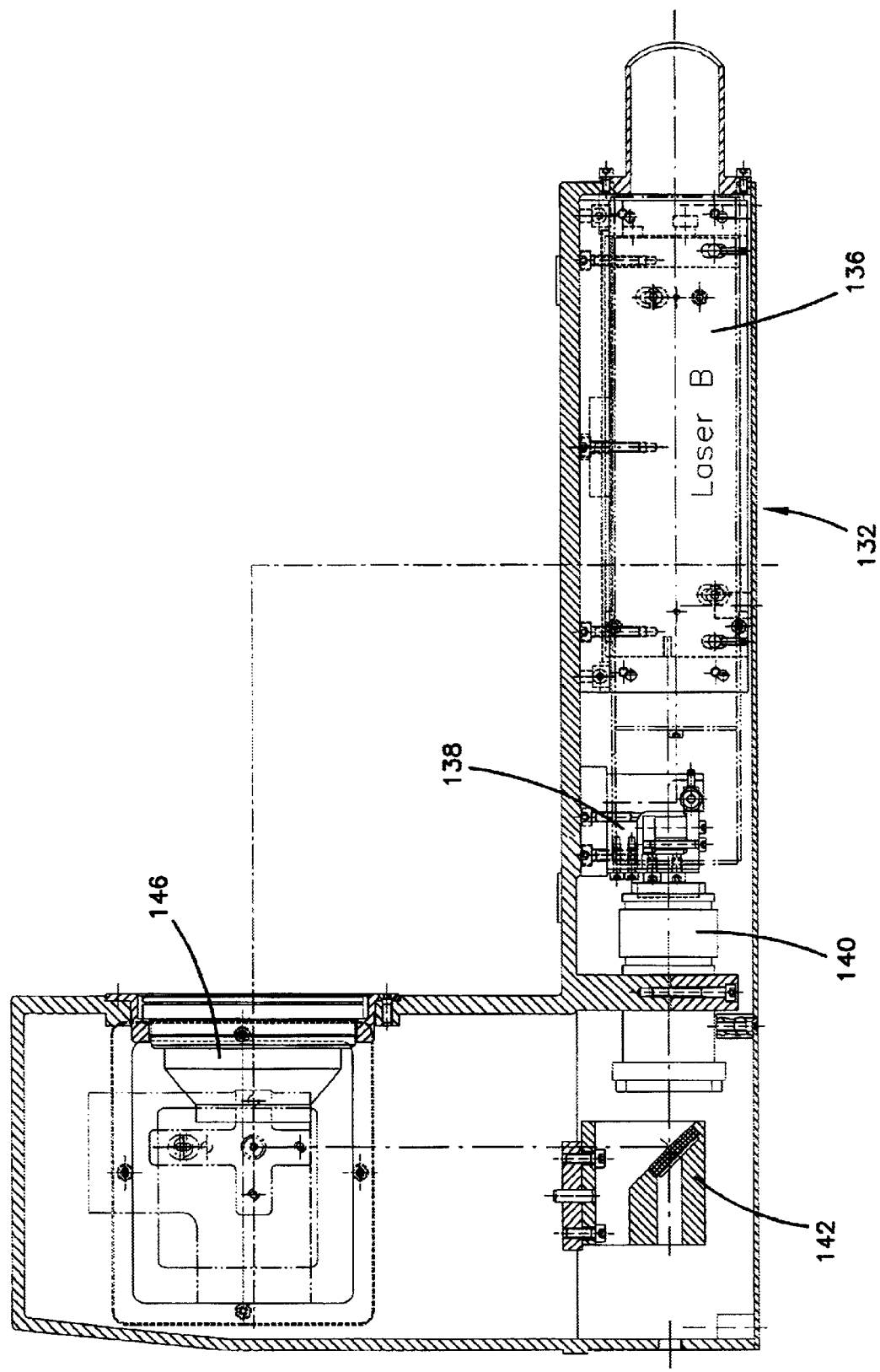
FIG. 12 is a sectional side view of the laser system.

A laser system 132 is suitably mounted adjacent to the table 120 for projecting laser pulses toward the wall 130 and the vertical portion of the passport 52 supported thereby, in order to perform the laser personalization. FIGS. 11 and 12 illustrate the details of the laser system 132. In the preferred embodiment, the laser system 132 utilizes a pair of lasers 134, 136 that are operated out of phase from each other during the laser personalization process. The use of two lasers 134, 136 operated out of phase permits an approximate doubling of the speed of the laser personalization process compared to the use of a single laser.

Figure 13:
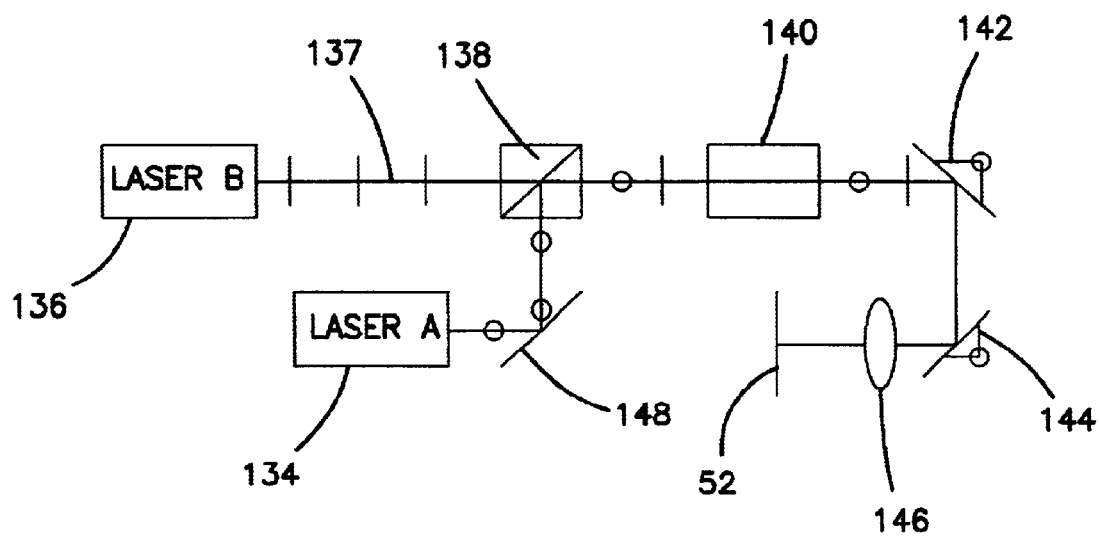
FIG. 13 is schematic illustration of the laser paths for the two lasers used in the laser system of the laser module.

In addition to the lasers 134, 136, the laser system 132 includes a prism 138 for combining the laser beams from the two lasers 134, 136, a beam expander 140 for increasing the diameter of the laser beam(s), a mirror 142 for deflecting the laser beam(s), a pair of positionable deflecting mirrors 144 and a lens 146. As illustrated, the lasers 134, 136 are arranged side-by-side, and therefore an additional deflecting mirror 148 is provided to deflect the pulses from laser 134 into the optical path 137, as shown in FIG. 13.

Figure 14:
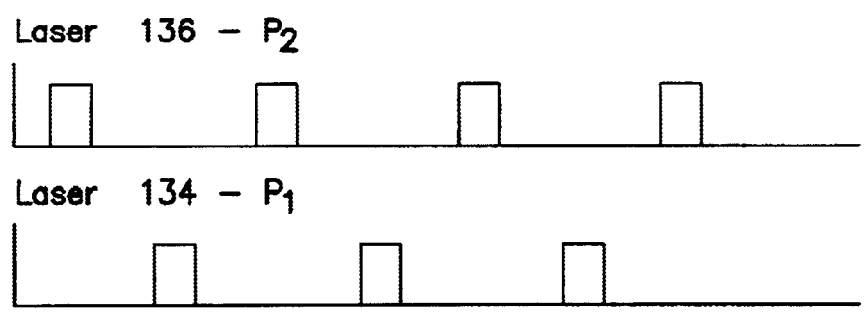
FIG. 14 illustrates the laser pulses for the two lasers.

The prism 138 is coated such that the laser beam from the laser 134 is reflected and sent in the direction of the beam expander 140 while the laser beam from the laser 136 passes directly through the prism 138 and to the beam expander 140. The phase relationship of the laser beam output pulses $P_1$ and $P_2$ from the lasers 134, 136 are illustrated in FIG. 14.

It is important that the deflecting mirrors 144 be positionable to permit laser personalization at any location on the passport page. In some applications, it is required that laser engraved images be located at defined distances with respect to pre-printed information on the polycarbonate page of the passport 52. In this regard, a registration process is employed to register the laser system with the pre-printed fields. The registration process utilizes a camera system to view the page of the passport and identify the location of the pre-printed fields with respect to the laser system. Appropriate adjustments are then made to the locations of the laser output to register with the desired pre-printed field. It is also desirable that the laser personalization module 16 employ a correction system to eliminate image distortions from optical components such as mirrors and lenses. A correction algorithm is used to adjust the position of the deflecting mirrors 144 during laser personalization such that image distortions are reduced or eliminated.

If laser personalization is the only personalizing process that needs to be performed, it is contemplated that the laser personalization module 16 could be designed to be able to close the passport 52 after laser personalization is complete. A pivoting closing flap 222 (illustrated in dashed lines in FIG. 10) similar to the closing mechanism used in the leafing module 14, is preferably incorporated onto the table 120 to accomplish the closing. Other closing mechanisms could be used as well. When the flap 222 is pivoted upward toward the wall 130, the edge 218 of the passport is pushed out from beneath the ledge 220 as the horizontal portion of the opened passport is pushed toward the vertical portion of the passport.

In the preferred embodiment, after laser personalization is complete, the belt 124 is driven by the motor 128 so that the tab 126 is engaged with the trailing edge of the passport, thereby moving the passport 52 out of the laser personalization module 16, and into the next module which in the preferred embodiment is the leafer/printing module 24 or the leafing module 18 if a separate leafing module is used. The table 120 is designed to permit unobstructed movement of the passport 52.

The leafer/printing module 24 will now be described in reference to FIGS. 15–20. As described above, the module 24 combines the functions of separate leafing and printing modules 18, 20. Although the preferred embodiment is described in relation to the module 24, it is to be realized that separate leafing and printing modules 18, 20 could be used instead of the combined leafer/printer module 24.

The leafer/printing module 24 is designed to receive the passport from the laser personalization module, lift the passport upward, turn the pages of the passport 52 to the next appropriate page that is to receive personalization in the form of printing, fully open the passport to a generally flat configuration, perform printing, lower the passport downward and return the passport to its ninety degree, partially open orientation, and either discharge the passport if printing is complete, or return the passport to the leafer function in the leafer/printer module 24 to turn to a new page needing printing.

Figure 15:
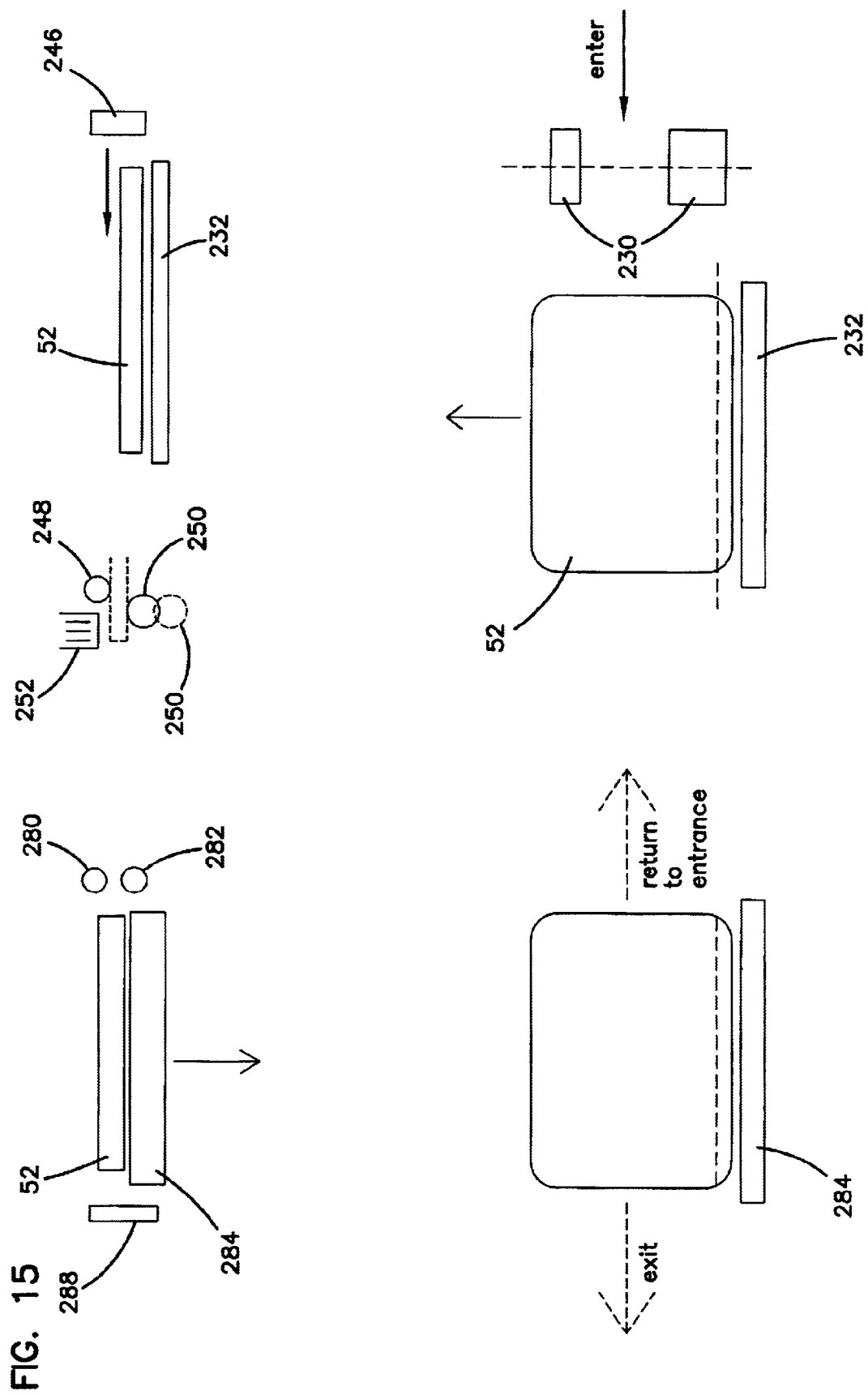
FIG. 15 schematically illustrates the process flow within the printer module.

Turning now to FIG. 15, the partially opened passport 52 enters the module 24 from an upstream module, preferably the laser personalization module 16, via an input mechanism that includes input rollers 230. The passport 52 enters onto a lift mechanism that includes a table 232. The table 232 is thereafter lifted upwards to bring the passport to a leafing and opening area where the passport is turned to the appropriate page and then fully opened to a flat orientation.

Figure 16D:
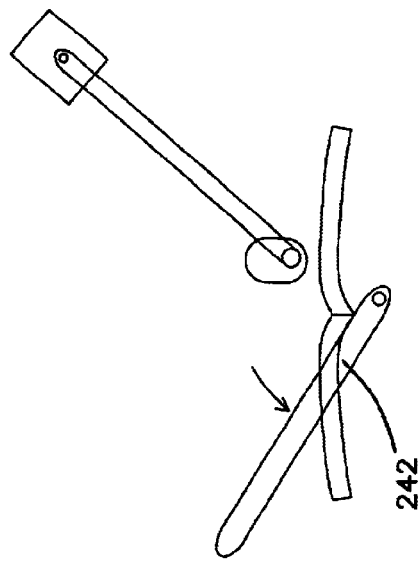
FIGS. 16A–D schematically illustrate passport entry, vertical lifting, leafing and opening in the printer module.
Figure 16C:
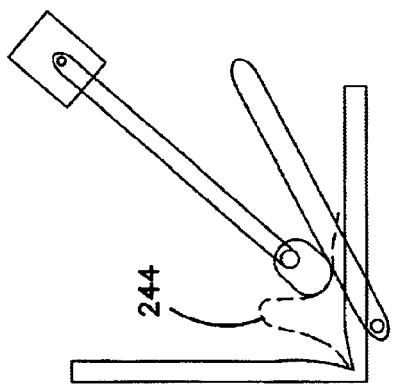
Figure 16B:
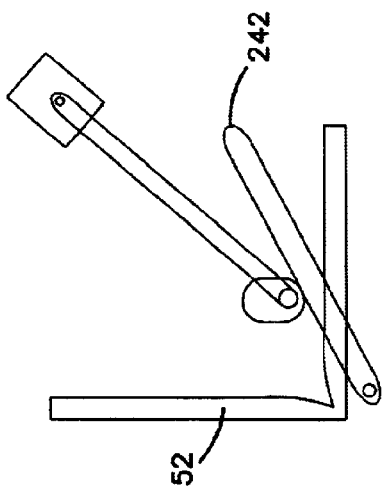
Figure 16A:
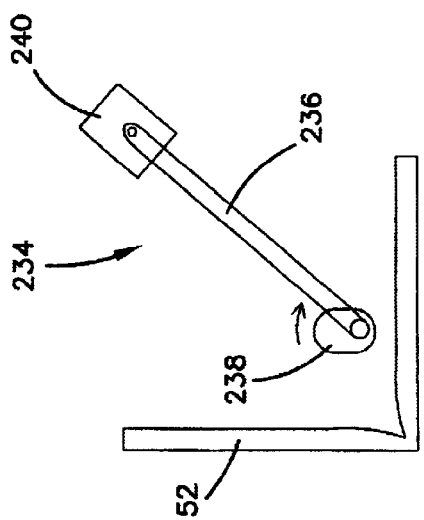

The mechanisms for page turning and fully opening the passport are illustrated in FIGS. 16A–D. FIG. 16A illustrates the passport 52 in its partially open configuration, before it is lifted upward by the table 232. A leafing mechanism 234 is provided that moves up and down with the table 232. The leafing mechanism 234 includes an arm 236 that extends toward the horizontal portion of the passport. Rotatably mounted on the end of the arm 236 is a pair of eccentric rollers 238 that are driven by a motor 240 disposed at the opposite end of the arm 236. The rollers 238 are designed to pick-up and turn one page from the horizontal portion to the vertical portion of the passport each time the rollers 238 rotate one clockwise revolution, similar to the rollers 104a, 104b in the leafing module 14.

FIG. 16B illustrates the passport 52 after it is lifted upwardly by the table 232. The passport remains in its partially open configuration, ready for leafing or page-turning. However, the passport is now positioned relative to an opening bar 242 that is pivotally mounted to fixed structure within the module 24. The opening bar 242 is designed to rotate or pivot in the direction of the arrow in FIG. 16B at the appropriate time to engage the vertical portion of the passport and fully open the passport. The bar 242 includes a portion that extends parallel to the spine of the passport, so that it is able to engage the vertical portion of the passport as the bar 242 is pivoted counterclockwise.

The leafing or page-turning operation is illustrated in FIG. 16C, in which the rollers 238 are rotated by the motor 240, thereby picking up one sheet 244 (illustrated in dashed lines) of the passport and moving the sheet 244 to a position against the vertical portion of the passport. Rotation of the rollers 238 is repeated until the page requiring printing is reached. Once the appropriate page is reached, the opening bar 242 is pivoted counterclockwise, as shown in FIG. 16D, thereby forcing the vertical portion of the passport down, thereby fully opening the passport to a generally flat orientation.

Figure 17:
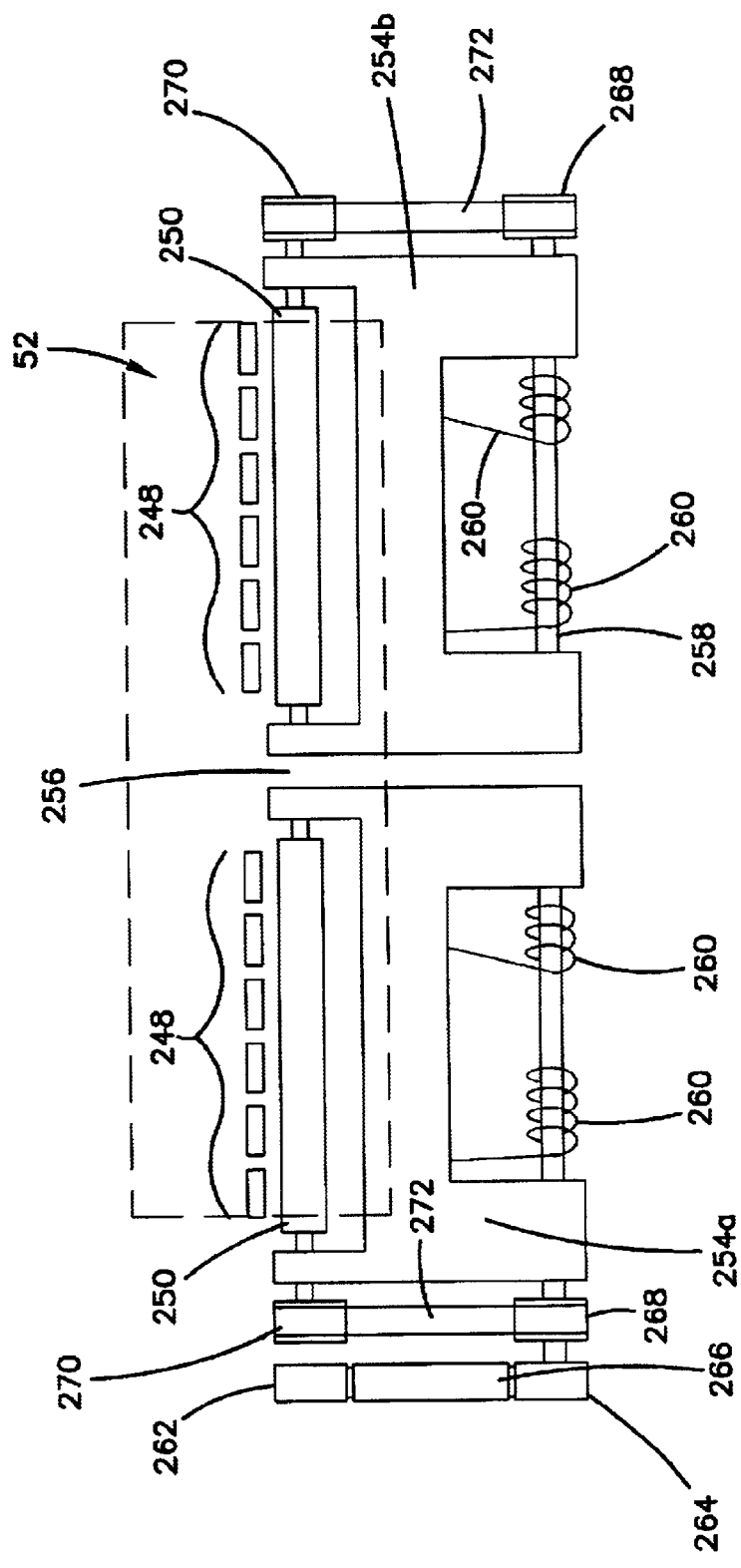
FIG. 17 illustrates a roller system designed to accommodate a different thickness on each half of the passport.
Figure 18:
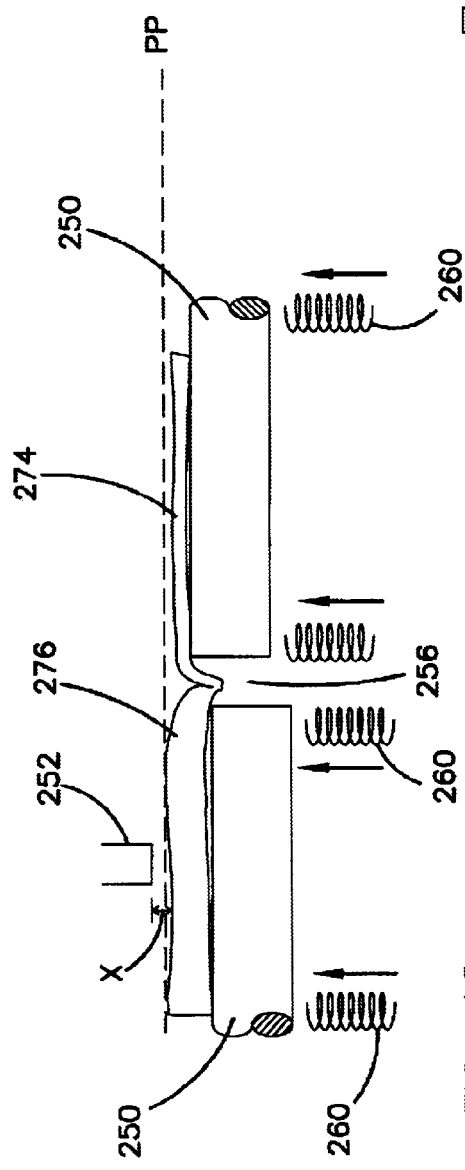
FIG. 18 schematically illustrates the principles behind the roller system of FIG. 17.

Returning to FIG. 15, once the opening bar 242 fully opens the passport, a pusher 246 is actuated in the direction of the arrow to push the passport toward the nip of rollers 248, 250. There are a plurality of each roller 248, 250 (the rollers 248, 250 extend into and out of the plane of the figure) whereby the rollers 248, 250 extend across and engage the majority of the passport. The rollers 250, which are described in detail with respect to FIGS. 17–19, are mounted for movement toward and away from the rollers 248, as illustrated in dashed lines in FIG. 15. The rollers 248 are rotatably mounted to support structure with respect to a print head 252 in the module 24 and are freely rotatable upon the open pages of the passport as the passport is driven between the rollers 248, 250. Prior to actuating the pusher 246, the rollers 250 are moved away from the rollers 248, thereby increasing the size of the nip and facilitating entry of the leading edge of the passport into the nip. Once the leading edge of the passport is positioned in the nip, as shown in dashed lines, the rollers 250 are then moved back toward the rollers 248 to pinch the passport therebetween. Movement of the rollers 250 toward and away from the rollers 248 can be accomplished using a suitable drive mechanism of the type generally known in the art. This movement and actuation of the rollers 250 is different from the independent adjustment motion described supra.

The print head 252, preferably an ink jet print head, prints personalization information onto the page(s) of the passport 52 as the passport is fed by the rollers 248, 250. The printer utilized with the system 10 is preferably an ink-jet printer with the capability of printing in black and in color. The ink-jet printer also has the capability to print many types of images including photos. The ink-jet printer that is used is preferably of the piezo-electric type for improved resolution. Piezo-electric technology in printers is known in the art. Like the laser personalization module 16, a registration process may be employed in the module 24 in order to ensure that the printing is aligned with pre-printed fields on the page to be printed on.

A difficulty encountered when printing on passports and other bound documents is that when the passport is fully open to the page(s) requiring printing, one half of the opened passport may have more pages and thus a larger thickness than the other half of the passport. When both halves of the passport are to be printed on, this difference in thickness can cause difficulties with the printing process because the thicker half of the passport will be closer to the print head 252 than the thinner half of the passport is. This difference in spacing from the print head 252 results in differences in print quality on the two halves of the passport. An additional difficulty is the presence of the spine of the passport, which tends to cause the pages of the passport adjacent the spine to bulge upward when the passport is fully opened. This bulging of the pages adjacent to the spine also affects the print quality, particularly adjacent to the spine.

The rollers 250 in the module 24 are designed to be self-adjusting to account for the different thickness on each passport half, and to accommodate the spine of the passport with minimal bulging. FIG. 17 illustrates the rollers 250, each of which is provided with an outer coating containing grit particles to form a high friction surface. Alternatively, the rollers 250 could be coated with an elastomer such as rubber or another material with suitable surface friction qualities. Each roller 250 is separately rotatably mounted on an H-shaped support 254a, 254b. A gap 256 between the ends of the rollers 250 and the supports 254a, 254b accommodates the spine of the passport which is illustrated in phantom line in FIG. 17. The opposite end of each support 254a, 254b is pivotally mounted on a shaft 258 whereby the rollers 250 can pivot towards and away from the rollers 248 through the pivoting motion of the supports 254a, 254b about the shaft 258. Bias springs 260 are disposed around the shaft 258 and each spring 260 includes one end engaged to fixed structure of the module 24 and an opposite end engaged with the support 254a, 254b whereby the supports 254a, 254b, and thereby the rollers 250, are resiliently biased in a direction toward the rollers 248.

The rollers 250 are driven by a motor (not illustrated) provided in the leafer/printer module 24, through a drive train that includes a drive gear 262 driven by the motor, and a gear 264 fixed to the shaft 258 and connected to the gear 262 via intermediate gear 266. The drive train further includes pulleys 268 that are fixed to the shaft 258, pulleys 270 that are fixed to the shafts of the rollers 250, and drive belts 272 extending between the pulleys 268, 270 whereby rotation of the drive gear 262 by the motor results in rotation of the rollers 250.

Figures 19A, 19B:
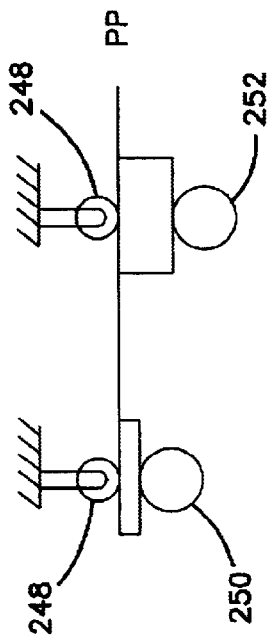
FIGS. 19A and 19B illustrate the roller system accommodating different passport thickness.

FIGS. 18, 19A and 19B schematically illustrate the self-adjustment feature of the rollers 250. Each roller 250 is independently mounted, with one roller 250 supporting one half 274 of the passport and the other roller 250 supporting the second half 276 of the passport. As shown in FIG. 18, the passport half 276 has more pages than the half 274, and is therefore thicker than the half 274. Due to the independent spring loading of the rollers 250, the roller 250 associated with the half 276 pivots downward against the bias of the springs 260 to accommodate the thicker half 276. In addition, the binding of the passport is between the two rollers 250 in the gap 256, thereby substantially reducing the bulging adjacent the spine that normally would occur without the gap 256 being present. As a result of this construction, the planes defined by the two halves 274, 276 are generally at the same level and the distance x between the print plane PP and the print head 252 is generally constant between the two halves 274, 276, thereby improving print quality.

Returning again to FIG. 15, after the printing run is complete, the passport 52 is fed by rollers 280, 282 onto a table 284 of a vertical drop mechanism. The table 284 lowers the passport back down to the level of the module 24 at which the passport entered through the rollers 230, and simultaneously returns the passport back to its partially open, ninety degree configuration.

Figure 20:
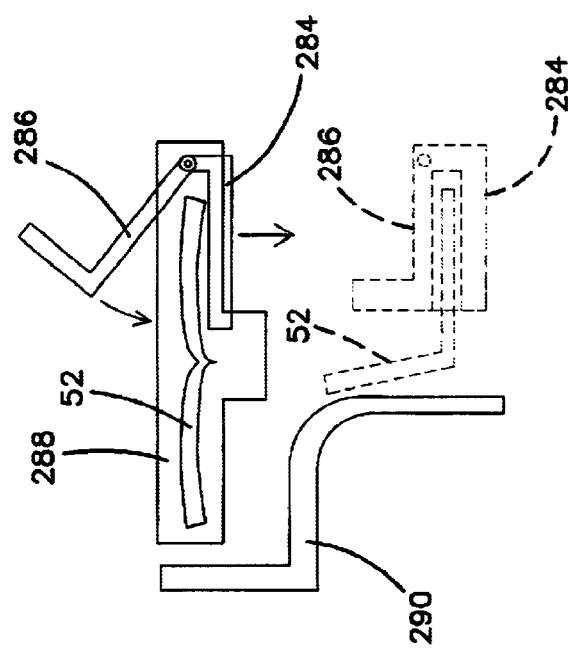
FIG. 20 schematically illustrates vertical dropping and partial closing of the passport after printing.

FIG. 20 illustrates the table 284 and how the passport is returned to its partially open configuration. The table 284 includes therewith a pivoting clamp 286 that, after the passport is driven onto the table by the rollers 280, 282, pivots downward to clamp one half of the passport against the table 284, as illustrated in dashed lines. To prevent the passport from being driven off of the table, a fixed stop 288 (shown in FIGS. 15 and 20) is positioned adjacent to the table 284. In addition, a fixed guide 290 is mounted to fixed structure in the module 24. The guide 290 is constructed and positioned such that as the table 284, with the passport half clamped thereto, is lowered, the non-clamped half of the passport 52 is pushed upward by the guide 290 to a generally vertical position. Thus, the passport is automatically returned back to its partially open configuration.

Returning once again to FIG. 15, once the passport is lowered, the passport can be recirculated back to the lifting table 232 by a suitable transport mechanism, such as rollers, if printing on additional pages is necessary. This recirculation of the passport can be repeated as many times as is necessary until all printing has been completed. The procedure described above for lifting, leafing, opening, printing and lowering is repeated each time the passport is recirculated.

If additional printing is not necessary, or once printing has been completed, the passport can be discharged from the module 24 to the next module in the system 10. If the next module is the output stacker module 22, a closing mechanism is preferably incorporated into the module 24 in order to completely close the passport prior to entering the module 22. A separate closing mechanism downstream of the module 24 could also be used as well. Once the passport is closed, it is transported to the output stacker module 22 where the passport is collected along with other finished, personalized passports.

In addition, when no ink-jet printing is needed, the passport can be passed through the module 24 from the inlet to the exit thereof, without lifting and driving the passport by the print head. Similar pass through capabilities are also preferably provided in the leafing module(s) and other personalization modules if present. Each module can also have passport closing capability, as well as the ability to receive and transport passports either partially open or closed.

It is contemplated that instead of lifting the passport after entering the module 24, and subsequently lowering the passport after printing, the module 24 could be constructed whereby the passport, after entering the module 24, is initially lowered prior to leafing and opening of the passport. Consequently, it will be appreciated that the printing plane PP in FIG. 18 and associated apparatus for printing could be located below the plane where the passport enters the module 24. In this way, the passport would be lowered after entering the module 24 and then subsequently raised after printing.

FIG. 21 illustrates the details of the output stacker 22. Input rollers 160 are provided to receive the closed passport 52 and drive the passport into the output stacker module 22 in cooperation with drive rollers 162. A rotatable selection gate 164 is located downstream of the rollers 160, 162 for directing the passport to either a collection receptacle 166 or to a reject bin 168. The gate 164 is rotatable about an axis as shown by the arrows in FIG. 21, with the gate 164 rotated clockwise deflecting the passport into the receptacle 166 and with the gate 164 rotated counterclockwise directing the passport to the reject bin 168. The gate 164 is preferably driven by a motor that is controlled by a controller in the output stacker module 22 based on whether the personalization of the passport has been completed satisfactorily or whether an error has occurred during the personalization process.

Within the output stacker module 22, the gate 164 is used to direct the passport 52 to one of three locations. With reference to FIG. 21A, satisfactory passports 52 are directed into the collection receptacle 166 by rotating the gate 164 counterclockwise before the leading edge of the passport 52 arrives at the front edge 164a of the gate 164. In this position, the gate 164 will direct the passport 52 into the collection receptacle 166. As the passport 52 continues to move into the collection receptacle 166 it will pass out of the rollers 162. The gate 164 then rotates clockwise such that the front edge 164a pushes the trailing edge of the passport 52 past a stack retainer 171a. In a similar process, passports 52 with errors are directed into the reject bin 168 by rotating the gate 164 clockwise before the leading edge of the passports 52 arrives at the front edge 164b of the gate 164. In this position the gate 164 will direct the passport 52 into the reject bin 168. As the passport 52 continues to move into the reject bin 168, it will pass out of the rollers 162. The gate 164 then rotates counterclockwise such that the front edge 164b pushes the trailing edge of the passport 52 past a stack retainer 171b. Passports 52 can also be directed through the output stacker module 22 by aligning the gate 164 such that the passport 52 passes between the front edges 164a, 164b and into rollers 163 and further into rollers 161 where it awaits transfer to the next module.

Like the input hopper module 12, the receptacle 166 of the output stacker module 22 includes a retention plate 170 disposed adjacent to the upper edges of the collected passports to keep the passports from sliding upward away from a bottom support plate and out of alignment. Further, the collection receptacle 166 has a spring side wall feature like the receptacle 50 in the input hopper module 12. In addition, multiple output stacker modules 22 can be included in the system 10 in order to increase capacity or to sort passports 52 into groups. Various sizes of passports 52 are accommodated by the output stacker module 22 using similar methods as described previously for the input hopper module 12.

Figure 22:
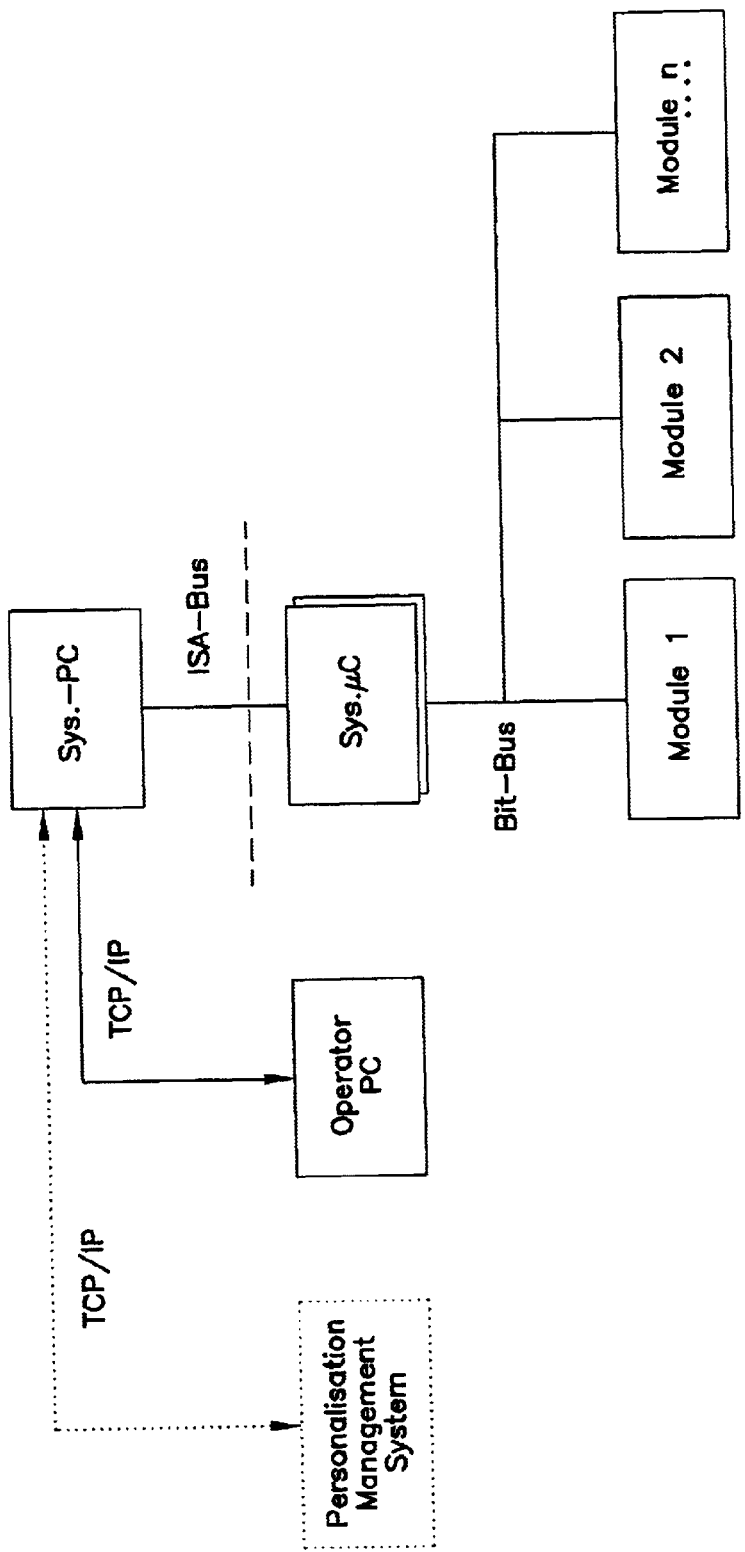
FIG. 22 illustrates a control strategy for the system.
Figure 23:
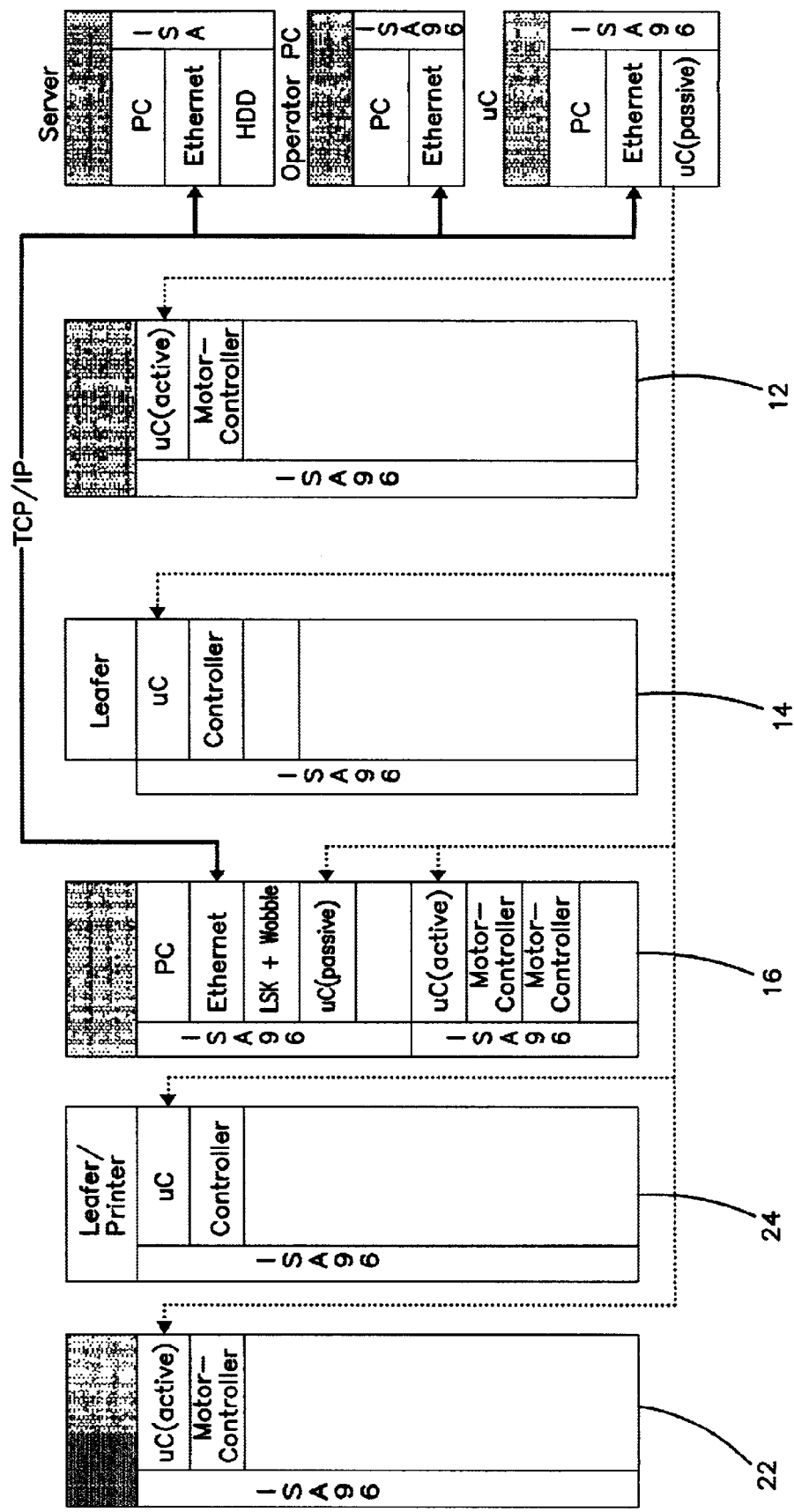
FIG. 23 illustrates a hardware layout for the system.

FIG. 22 illustrates a control strategy for the system 10, while FIG. 23 illustrates a hardware layout for the system electronics. For ease of construction and reconfiguration of the system 10, the use of male/female connectors to electrically and mechanically connect the modules to each other may be employed. The male/female connections perform the combine functions of power distribution and communication to and from the modules. The control of personalization modules in a modular system is known from U.S. Pat. Nos. 5,037,216 and 5,266,781.

In another embodiment, the system 10 can be configured with suitable machinery that is controlled by the system 10 to enable the personalized passport 52 to be placed into an appropriate mailing container along with other personalized and/or non-personalized documents. This completed assembly would then be ready for delivery to the recipient by common mail carriers or other parcel delivery services, or to await pickup by the recipient in person. The automatic grouping of different types of documents all intended for the same recipient saves time and reduces errors caused by individual handling.

In addition, another advantage of the system 10 is that different types of documents can be processed either at different times or at the same time. For example, one input hopper module could hold passports while a second input hopper module could hold identity cards. These separate documents could be processed one after the other and then grouped together in a delivery system if they are for the same recipient, or be held in the same output stacker module next to each other, or held in separate output stacker modules.

The concepts and systems described herein also have utility in non-passport applications, such as in producing identification cards, as well as in personalizing and/or printing books and booklets and other multi-page bound documents.

While a particular embodiment of the invention has been described, it will be understood that by those skilled in the art that the invention is not limited by the application, embodiment or the particular devices disclosed and described herein. It will be appreciated that other devices that embody the principles of this invention and other applications therefore other than as described herein can be configured within the spirit and intent of this invention. The systems and apparatus described herein are provided only as examples that incorporates and practices the principles of this invention. Other modifications and alterations are well within the knowledge of those skilled in the art and are to be included within the broad scope of the appended claims.

The above specification, examples and date provide a complete description of the invention. Since many embodiments of the invention, not explicitly described herein, can be made without departing from the spirit and scope of the invention, the invention resides in the claims hereinafter appended.

We claim:

1. A system for personalizing a multiple page, bound document, comprising:
    an input mechanism constructed to hold a plurality of the bound documents to be personalized;
    first and second leafing mechanisms disposed downstream from said input mechanism, said first and second leafing mechanisms each including apparatus for turning pages of the document, and said first leafing mechanism is disposed upstream of said second leafing mechanism;
    first and second personalization mechanisms disposed downstream from said input mechanism, said first personalization mechanism is configured to perform a personalization operation on a page of the document that is different from a personalization operation performed by said second personalization mechanism, and said first personalization mechanism is disposed upstream of said second personalization mechanism; and
    said first and second leafing mechanisms and said first and second personalization mechanisms are arranged so that said first leafing mechanism is disposed upstream of said first personalization mechanism end said second leafing mechanism is disposed upstream of said second personalization mechanism.

2. The system of claim 1, wherein at least one of said first and second personalization mechanisms comprises a laser personalizing module that includes a laser for laser personalizing a page of the bound document.

3. A The system of claim 1, wherein said input mechanism is configured to hold the bound documents in a closed configuration.

4. The system of claim 1, wherein at least one of said first and second personalization mechanisms comprises a printer mechanism that is configured to perform printing on a selected page of the bound document.

5. The system of claim 4, wherein said printer mechanism and one of said first and second leafing mechanisms are combined into a single module.

6. The system of claim 4, wherein said printer mechanism includes a print head, and further including a recirculating mechanism for recirculating the bound document to a location upstream of the print head after printing by the print head.

7. The system of claim 1, further comprising an integrated circuit chip module.

8. The system of claim 1, wherein at least one of said first and second leafing mechanisms is configured to pass the document therethrough without turning a page of the document.

9. The system of claim 1, wherein at least one of said first and second personalization mechanisms is configured to pass the document therethrough without performing a personalization operation.

10. The system of claim 1, wherein the bound document is a passport.

11. The system of claim 1, wherein the system includes a transport path, and the input mechanism comprises a receptacle for holding a plurality of the bound documents, the axis of the receptacle being disposed at an angle to the transport path so that bound documents held by the receptacle me out of the transport path.

12. A method of personalizing a multiple page, bound document, comprising:

inputting a bound document into a first leafing mechanism;

turning to a first preselected page using the first leafing mechanism;

inputting the document into a first personalization mechanism;

performing a personalization operation on the first preselected page; and inputting the bound document into a second leafing mechanism downstream from the first personalization mechanism, turning to a second preselected page, inputting the document into a second personalization mechanism downstream from the second leafing mechanism, and performing a personalization operation on the second preselected page that is different from the personalization operation performed by the first personalization mechanism.

13. The method of claim 12, wherein the first personalization mechanism comprises a laser personalization module, and performing a personalization operation comprises performing a laser personalization operation.

14. The method of claim 13, wherein the laser personalization operation comprises at least one of engraving or laser perforation.

15. The method of claim 12, wherein an input mechanism holding a plurality of the bound documents is located upstream of said first leafing mechanism, and further including mechanically picking the bound document from the input mechanism and inputting the picked document into the first leafing mechanism.

16. The method of claim 12, further including discharging a personalized bound document into an output mechanism.

17. The method of claim 12, further including closing the document.

18. The method of claim 12, wherein the first personalization mechanism comprises an integrated circuit chip module, and performing a personalization operation comprises using the integrated circuit chip module to program an integrated circuit chip on the document.

19. The method of claim 12, wherein the document is a passport.

20. A system for personalizing a multiple page, bound document, comprising:

a plurality of personalization mechanisms each of which is configured to perform a personalization operation on one or more pages of the document; and a plurality of leafing mechanisms each of which includes apparatus for turning pages of the document;

wherein the personalization mechanisms and leafing mechanisms are arranged such that for each said personalization mechanism that performs a personalization function on a page of the document that is different from a page personalized by a preceding one of said personalization mechanisms, there is one of said leafing mechanisms associated with each said personalization mechanism for turning to a correct page.

21. The system of claim 1, wherein at least one of said first and second leafing mechanisms includes apparatus for fully opening the bound document to define first and second document halves, and one of said first and second personalization mechanisms comprises a printer mechanism that includes a print head and a mechanism for maintaining a generally constant distance between the first and second halves and the print head during printing.

22. The system of claim 21, wherein the mechanism for maintaining a generally constant distance comprises a first roller supporting the first half, and a second roller supporting the second half and spaced from the first roller defining a gap therebetween.

23. The system of claim 22, wherein the bound document includes a spine, and the spine is positioned in the gap between the first and second rollers during printing.

24. The method of claim 12, wherein if additional personalization by either the first personalization mechanism or the second personalization either is necessary, returning the document back to at least one of:

a) the first leafing mechanism after the personalization operation on the first preselected page by the first personalization mechanism, or b) the second leafing mechanism after the personalization operation on the second preselected page by the second personalization mechanism.

\* \* \* \* \*